Aug. 8, 1944.  W. A. LAUDER ET AL  2,355,087
TELESCRIBER
Filed Aug. 2, 1941  10 Sheets-Sheet 1
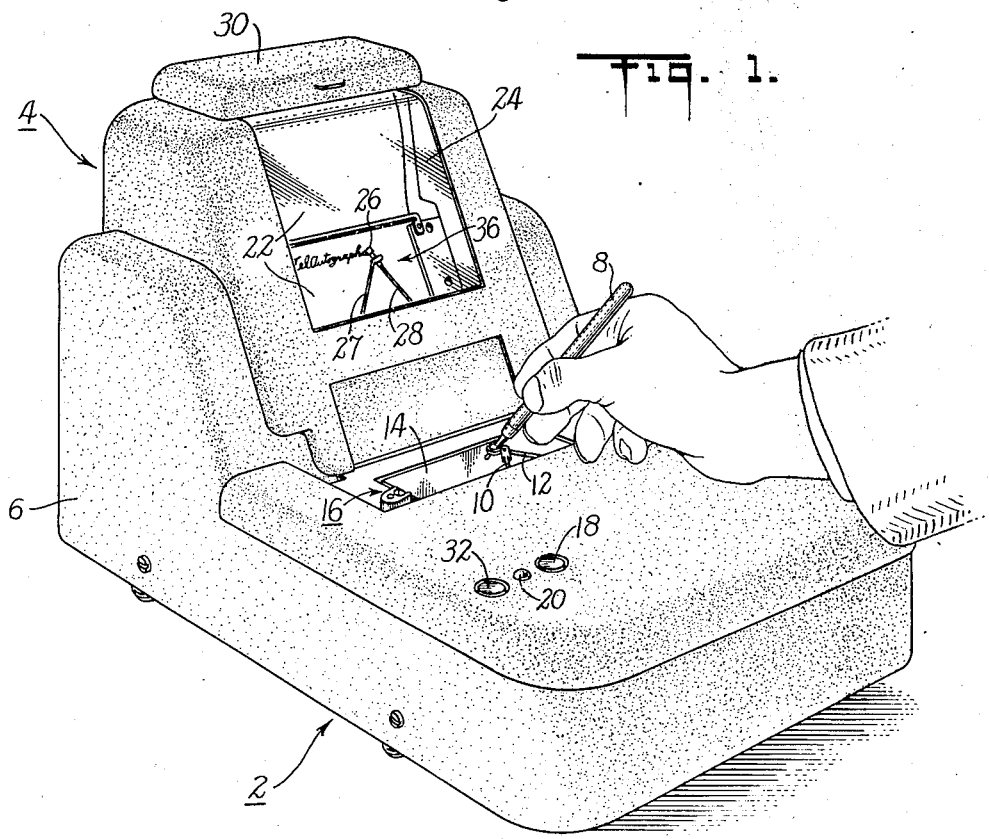
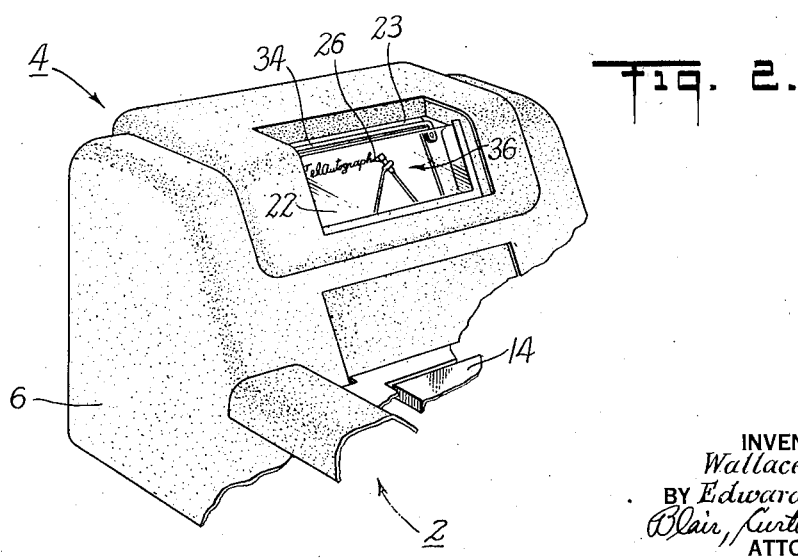
INVENTORS
Wallace A. Lauder
BY Edward F. Cahoon
Blair, Curtis & Hayward
ATTORNEYS

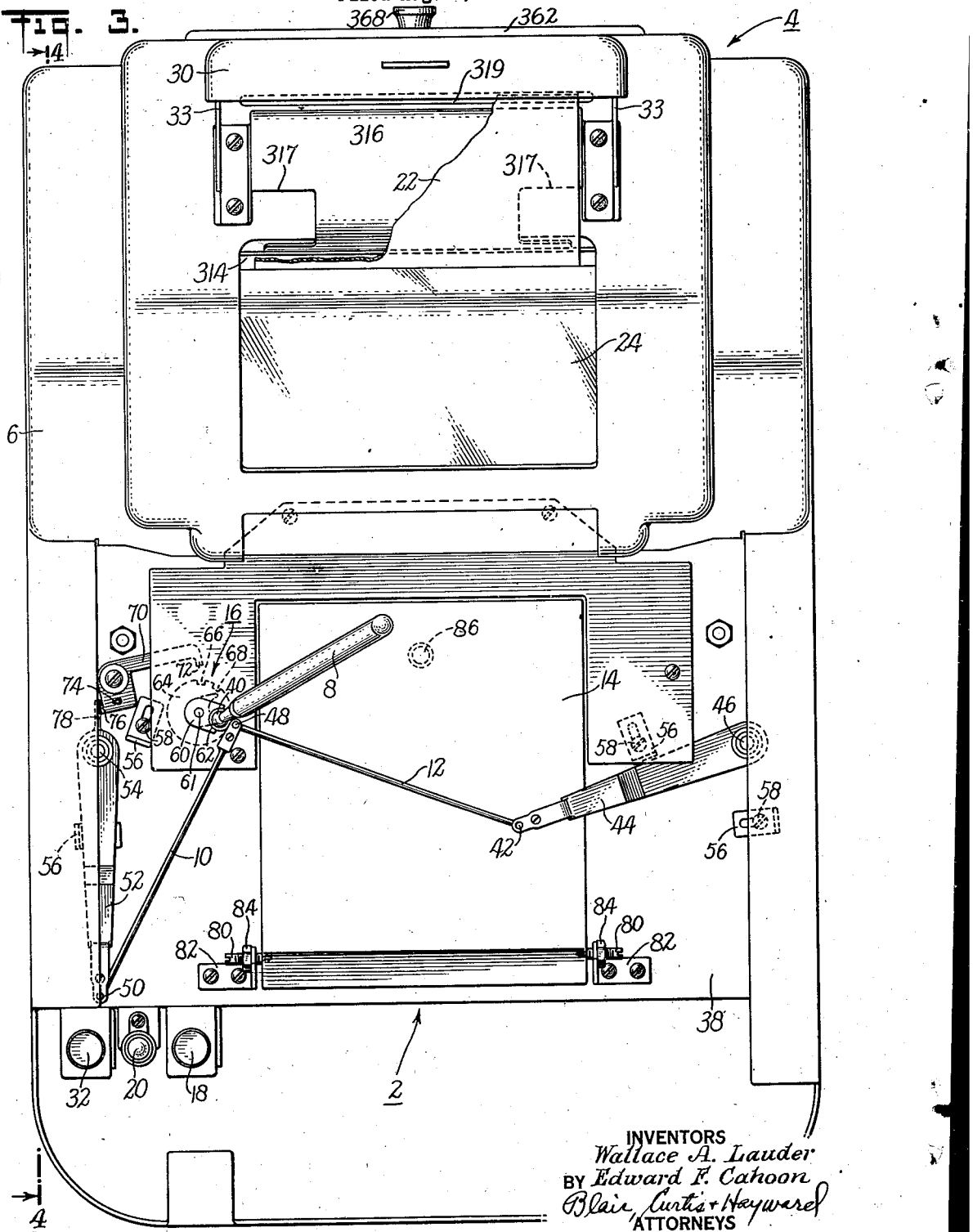

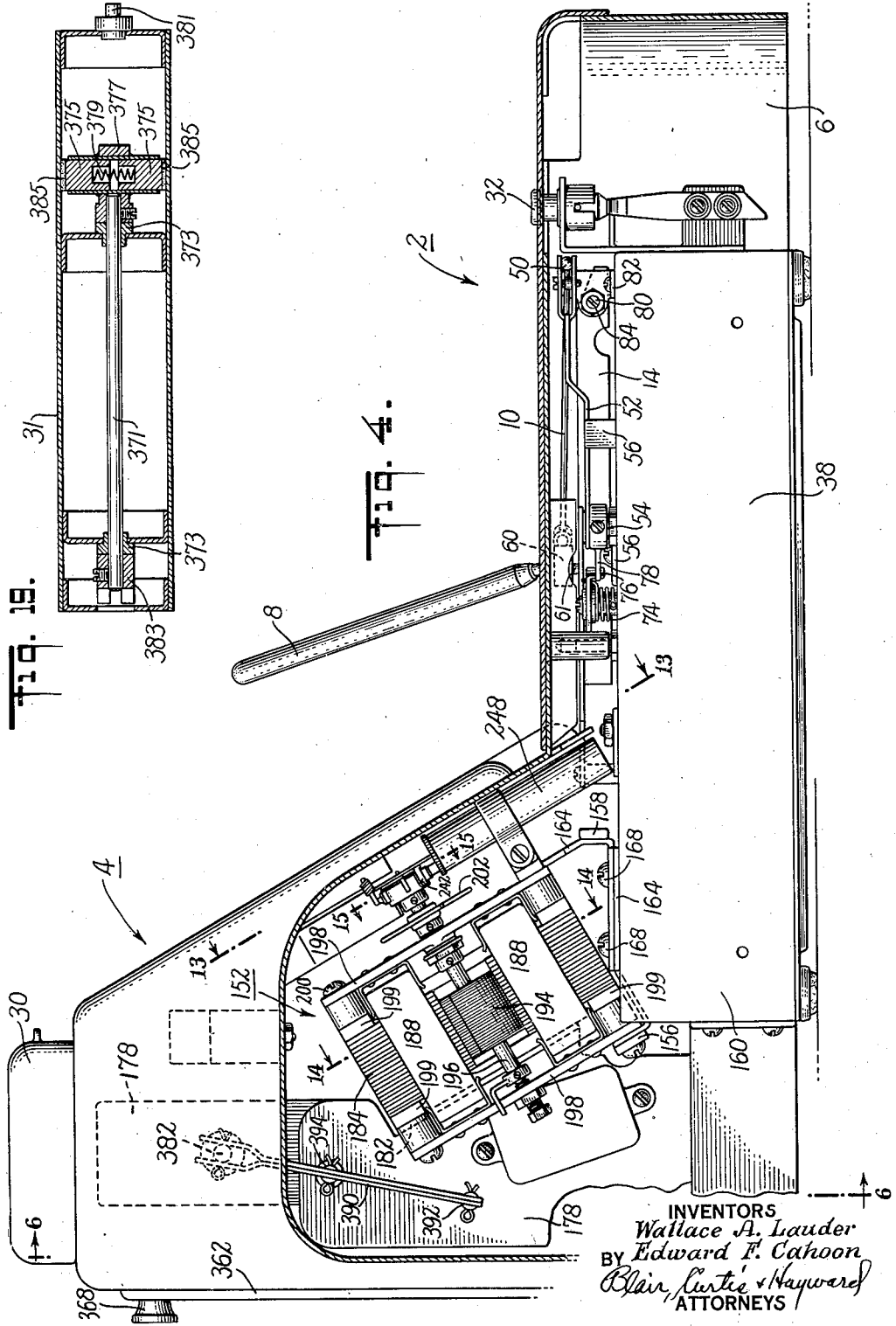

Aug. 8, 1944.   W. A. LAUDER ET AL   2,355,087
TELESCRIBER
Filed Aug. 2, 1941   10 Sheets-Sheet 4

INVENTORS
Wallace A. Lauder
BY Edward F. Cahoon
Blair, Curtis & Hayward
ATTORNEYS

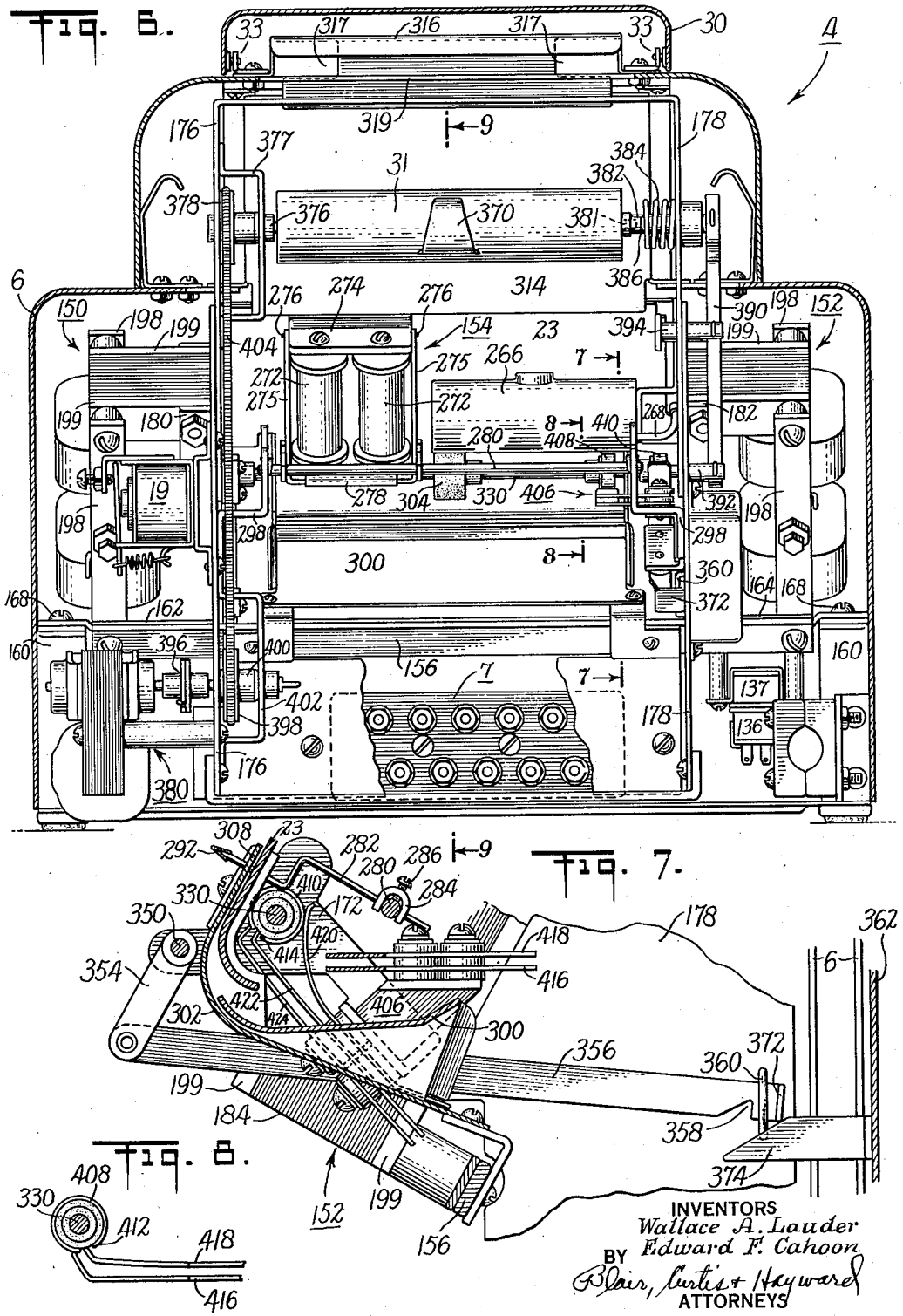

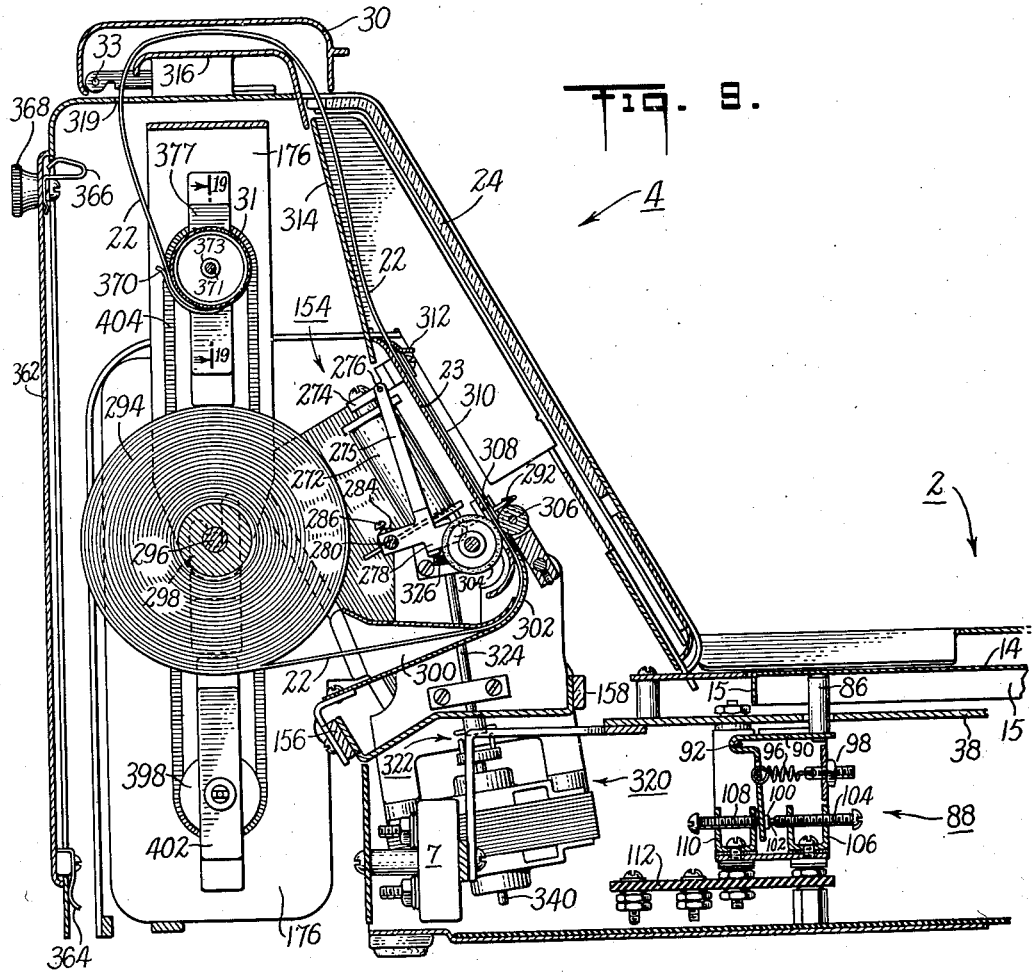
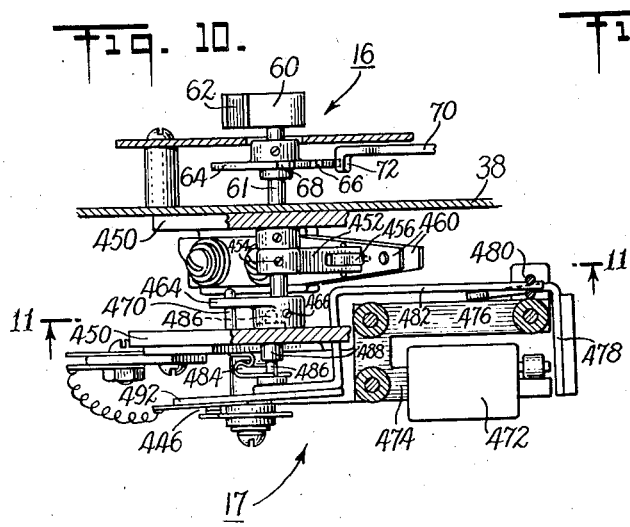
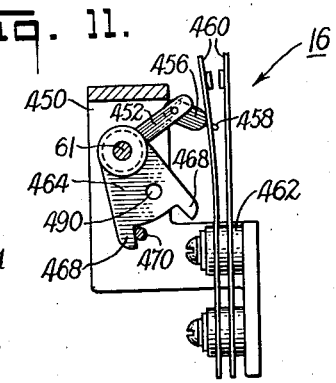

Aug. 8, 1944.   W. A. LAUDER ET AL   2,355,087
TELESCRIBER
Filed Aug. 2, 1941   10 Sheets-Sheet 9

INVENTORS
Wallace A. Lauder
BY Edward F. Cahoon
Blair, Curtis & Hayward
ATTORNEYS

Patented Aug. 8, 1944

2,355,087

UNITED STATES PATENT OFFICE 2,355,087

TELESCRIBER

Wallace A. Lauder, Closter, and Edward F. Cahoon, Tenafly, N. J., assignors to Telautograph Corporation, New York, N. Y., a corporation of Virginia Application August 2, 1941, Serial No. 405,226

25 Claims. (Cl. 178—19)

This invention relates to improvements in methods and apparatus for instantaneously transmitting facsimiles of the traces of graphic characters from one location to another.

Certain forms of such apparatus, known as writing telegraphs or telescribers, have in the past been proposed for accomplishing the purposes of this invention. Although only one type of such apparatus has proved to be commercially feasible, this type of telescriber has been in satisfactory commercial operation for almost half a century. It operates by developing two direct current voltages, each of which varies with the variation in the coordinates of the position of a stylus tracing the graphic characters to be transmitted. These two direct current voltages, usually obtained from movable taps on resistive potentiometers connected across a D. C. power supply, are transmitted over suitable electric lines to distant receiver units. In the receiver units these two D. C. voltages are applied to two D. C. motors, each one responsive to a D. C. voltage which corresponds to one of the coordinates, to drive suitable linkage systems which move a pen over a writing surface, usually a strip of paper positioned beneath the pen, to reproduce a facsimile of the graphic characters transmitted.

With the increasingly widespread use of alternating current power, such machines were subject to the frequent disadvantage of requiring motor generator or rectifier systems to supply them with direct current. Furthermore, such machines were ungainly in appearance due to the type and arrangement of the operating components, and inefficient in the use and handling of the paper upon which the graphic characters were reproduced.

Accordingly, therefore, it is an object of this invention to provide improved methods and apparatus for telescribing graphic characters, and to provide such improved telescriber apparatus capable of operating on an alternating current power supply.

It is a further object of this invention to provide telescriber apparatus having improved means for handling the record strip upon which the graphic characters are reproduced, to provide means for improving the visibility of the message transmitted, and to provide means for more simply handling and more efficiently using the record paper.

These and other objects and advantages of this invention, which will be in part obvious and in part pointed out hereinafter, are obtained by the means described in the following specification, and may be more readily understood by reference to the accompanying drawings, showing one or more of the various possible embodiments of this invention, in which:

Figure 1 is a perspective view of a new and improved combined telescriber transmitter and receiver unit, embodying the invention herein described, in which the paper strip, upon which the messages sent and received are recorded, is wound up in the machine itself for future reference;

Figure 2 is a perspective view of a telescriber similar to that shown in Figure 1 but embodying a different type of message paper handling arrangement, in which the message may be torn from the machine as soon as it has been recorded;

Figure 3 is a plan view of the transceiver shown in Figure 1 with portions broken away to show details of the transmitter stylus linkage and the message paper handling structure;

Figure 4 is a section of the machine, taken on line 4—4 of Figure 3;

Figure 6 is a vertical section of the machine, taken on line 6—6 of Figure 4;

Figure 7 is an enlarged sectional view of the contact structure of the paper handling mechanism, taken on line 7—7 of Figure 6;

Figure 8 is a similar view of a portion of this same structure, taken on line 8—8 of Figure 6;

Figure 9 is a vertical section of the machine, taken on line 9—9 of Figure 6;

Figure 10 is an enlarged sectional view of the stylus interlock switch and relay structure, taken on line 10—10 of Figure 5;

Figure 11 is a similar view of a portion of this same structure, taken on line 11—11 of Figure 10;

Figure 17 is a schematic electric wiring diagram of the telescriber transceiver shown in Figure 1;

Figure 18 is a portion of Figure 17 schematically showing the paper handling mechanism contacts in an alternative position; and Figure 19 is a longitudinal cross-section of the record strip take-up roll, taken on line 19—19 of Figure 9.

Figure 5:
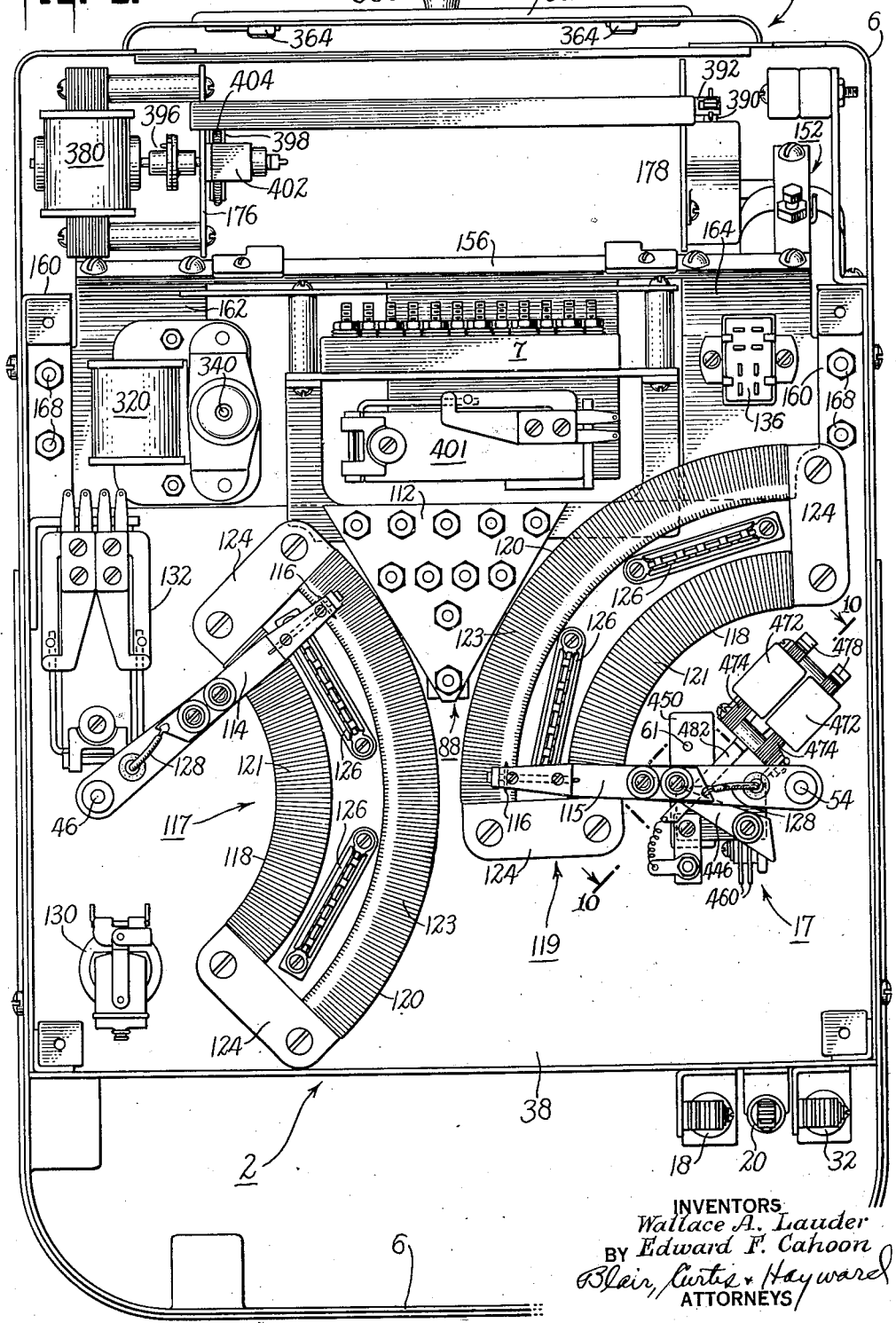
Figure 5 is a plan view of the bottom of the machine.

A brief preliminary description of the general layout and operation of the telescriber instrument embodying the invention may be helpful at the outset in order that the detailed description following may be more readily understood. Referring to Figure 1, the telescriber transceiver, in accordance with this invention, comprises a transmitter portion, generally indicated at 2, and a receiver portion, generally indicated at 4, mounted on a common base in a housing member 6. The transmitter portion 2 is provided with a pencil-like stylus member 8 pivotally joined to a pair of link driving members 10 and 12 which are connected through suitable linkage mechanism (not shown in Figure 1) to operate transmitting elements, hereinafter to be described, forming part of the transmitter portion 2 housed in the casing 6. The machine is put in operation by rotating with the stylus 8 a "unison" switch, generally indicated at 16, located at one corner of a transmitting platen 14. The unison switch 16 is provided with an interlock arrangement interconnected with the linkage structure moved by the stylus 8 so that it can be operated only by the stylus. A signal arrangement is provided so that, when the machine is not in operation, a signal circuit may be actuated by pushing a push-button 18 on the transmitter portion 2 to operate a suitable buzzer at a distant receiving station suitably connected to the transmitter, thus announcing that a message is about to be transmitted. Similarly a suitable buzzer 19 (not shown in Figure 1) is provided in the receiver portion 4 to be actuated when a distant transmitter wishes to transmit to the local receiver. The operator then traces the graphic characters to be transmitted on the metal platen 14 with the stylus 8. In addition to being connected to a distant receiving apparatus, the local transmitter 2 is also connected to the local receiving apparatus 4 so that the operator can see the characters he is transmitting. A strip of message paper 22, fed through the machine in a manner hereinafter to be described, passes over a metal platen 23 (not shown in Figure 1) and underneath a pen 26, and is protected by a transparent window 24 forming part of the receiving portion 4 of the machine, as shown in Figure 1. The pen 26 is suitably attached to two linkage members 27 and 28 which in turn are connected to two telescriber receiving motors (not shown in Figure 1) mounted in the receiver portion 4 of the telescriber. These motors drive the pen 26 across the paper strip 22 within the receiver writing area, generally indicated at 36, to reproduce the characters traced by the operator with stylus 8 on the platen 14, or the trace of characters transmitted to the receiver 4 from some remote transmitting station (not shown).

The "busy" lamp 20 is lighted only when a remote transmitting station, connected to the local transceiver, is turned on to transmit a message to the local receiver portion 4. At the same time that "busy" lamp 20 is lighted an interlock relay, generally indicated at 17 (not shown in Figure 1), is energized to lock the unison switch 16 in "off" position to prevent a message being sent from the local transmitter 2 while the local receiver 4 is recording a message from the distance transmitting station.

In the telescriber shown in Figure 1, all messages transmitted by the transmitter portion 2 or received from a remote transmitter by the receiver 4 are recorded on the paper strip 22 which is unwound and rewound within the receiver housing 4 by a paper handling mechanism, hereinafter to be described. The receiver portion 4 is provided with a hinged cover 30 hinged at 33 which may be lifted to provide access to the paper strip 22 on which messages have already been recorded so that ready reference may be made to such prior messages by unwinding the strip from a paper takeup roll 31 (not shown in Figure 1). A push-button 32 is provided on the transmitter portion 2 of the telescriber to operate a paper rewind motor to rewind this paper after reference has been made to such previous messages.

The telescriber transceiver shown in Figure 2 is similar to that shown in Figure 1 except that the rewind-type of paper handling device is not incorporated therein. Instead, a tear-off strip 34 is provided across the top of platen 23. Thus, as soon as a message is recorded on the record strip 22 in the receiver writing area 36 by the pen 26, the paper strip 22 can be shifted upwardly so that the message may be immediately detached from the machine, if desired.

In a telescriber instrument made in accordance with this invention, a message can be read as it is being written without the linkage members 27 and 28 obscuring any portion of the message because the pen 26 and its driving links 27 and 28 are always beneath the pen 26 and the tear-off strip 34. Furthermore, the message may be removed from the machine immediately it is received without wasting paper, because it is written on the end of the paper strip instead of at some intermediate place on the strip, as was necessary in the previously known telescriber instruments.

Now that the general construction and operation of the telescriber illustrated has been described, the detail of its structure may be more readily understood. Referring to Figures 3, 4, and 5, as above-mentioned, the telescriber transceiver illustrated comprises a transmitter portion 2, which is mounted in a metal chassis or frame 38 and a receiver portion 4 mounted on a frame secured to chassis 38, and this entire assembly is contained in a housing structure 6. The stylus 8 of the transmitter portion 2 is connected by a ball-and-socket type joint 40 to one end of the right-hand stylus linkage member 12, which in turn is connected through another ball-and-socket type joint 42 to one end of a lever arm 44 securely fastened to a vertical shaft 46 suitably journaled at the right-hand side of the transmitter chassis 2. The left-hand stylus linkage member 10, which is pivotally connected to the stylus end of right-hand linkage member 12 by a ball-and-socket type joint 48, is connected in a similar manner by a ball-and-socket type joint 50 to the end of a lever arm 52 secured to a vertical shaft 54 journaled in the left-hand side of the transmitter chassis opposite the vertical shaft 46. These linkages, levers, and ball-and-socket joints cause the vertical shafts 46 and 54 to be rotated, respectively, in a manner related to the variation in each of the coordinates of any graphic character traced by the stylus 8 on the metal platen 14. Four L-shaped brackets 56 are suitably adjustably secured to the upper surface of the transmitter chassis 38 by screws 58 to act as stops for the arms 44 and 52 to limit the motion of the tracing end of the stylus 8 to points within a predetermined writing area on the platen 14. The upper end of the shaft 61 of the unison switch 16, a switch of the rotary-toggle type (see Figures 10 and 11) which is mounted on the top of chassis 38, is provided with an actuating arm 60 having a semi-circular concavity 62 on one side thereof into which the ball-and-socket joint 40 of the stylus 8 may be fitted to move the switch from its "off" position shown by the solid lines in Figure 3, to its "on" position shown by the dotted line. In order to prevent the unison switch 16 from being operated when the stylus is not in its neutral or "unison" position at the switch 16, the switch shaft 61 is provided with a circular cam member 64 having two recesses 66 and 68 cut in its periphery, as shown in the drawings. A bellcrank 70 is pivoted adjacent the cam 64 and one of its free ends 72, shaped as a pawl to fit snugly into the recesses 66 and 68 of cam 64 when unison switch 16 is in its "off" or "on" positions, respectively, is biased toward the periphery of the cam 64 by a spiral spring 74 (see Figure 4). The other end 76 of the bellcrank 70 is bent downwardly to intercept the path of a pin 78 projecting from the left-hand vertical shaft 54. Thus, when stylus 8 is in its neutral position so that the left-hand lever 52 is in its most clockwise position, as shown in Figure 3, the pin 78 attached thereto contacts the end 76 of pawl 70 and moves it away from cam 64 in opposition to the force of spiral spring 74 to lift the pawl-like end 72 out of one or the other of the recesses 66 or 68 so that stylus 8 may be used to rotate the unison switch from one position to the other. It will be evident that for all other positions of the stylus, except the neutral position shown in Figure 3 when pin 78 contacts the bellcrank arm 76, the end 72 of the pawl 70 will rest in one of the recesses 66 or 68 in cam 64 and thus prevent rotation of the unison switch. This structure acts as a safety lock to prevent the machine from being turned on at any time except when the stylus 8 is in neutral position. This, as will be pointed out hereinafter, prevents the receiving pen 26 from jumping from its neutral position at the left-hand side of the receiving platen 23 to some intermediate point in the receiver writing area 36 when the telescriber is energized. This prevents strain in the mechanism and eliminates any danger that the receiving pen 26 may splash ink over the recording strip 22, as might occur should the pen be suddenly removed from its neutral position to the middle of the writing area 36. If it were not for this safety feature, this latter action might occur, because, as will hereinafter be described, when a telescriber transmitter is energized, the recording pens in all receivers connected thereto immediately assume a position corresponding to the position of the transmitting stylus. If this position is any other than some chosen neutral position, the pens will snap from their normal neutral positions to positions corresponding to the transmitter stylus position, thus endangering the pen driving mechanism and probably splashing ink over the recording strip.

Details of the contact structure of unison switch 16 are shown in Figures 10 and 11. Switch shaft 61 is journaled in a bracket 450 secured to the under side of the top of transmitter chassis 38. An arm 452, secured to shaft 61 by a set screw 454, carries a toggle member 456 of insulating material pivoted at its outer end. The toggle member 456 carries a pin 458 on its outer end which projects through a hole in one of a pair of leaf spring contacts 460 secured to but insulated from the bracket 450 by the usual stack construction 462. When arm 452 and toggle member 456 are in the position shown in Figure 11, the leaf spring contacts 460 are separated and thus unison switch 16 is in "off" position. When the switch actuating arm 60 is moved by stylus 8 to its "on" position shown by the dotted lines in Figure 3, shaft 61 is rotated in a clockwise direction, as seen in Figure 11, moving toggle member 456 to its alternative position and closing contacts 460. Shaft 61 is also provided with a segmental arm 464, secured thereto by set screw 466, having two radially extending projections 468 which coact with a pin 470 to act as stops limiting the rotation of shaft 61 of the unison switch 16 to its "off" and "on" positions.

The interlock relay 17 is also secured to this unison switch structure 16. Referring to Figure 10, this relay comprises a pair of windings 472, each surrounding one leg 474, respectively, of two U-shaped magnets 476. When these windings 472, which are connected in series, are energized, in the manner hereinafter to be described in connection with the circuit diagram of the instrument shown in Figure 17, they attract an L-shaped armature member 478 pivoted at 480. Movement of the armature 478 tends to pivot a crank-shaped lever 482 about the pivots 480 so that its free end presses upwardly against a spring member 484 which pushes a pin 486, slidably positioned in a sleeve 488, upwardly against the segmental arm 464. If unison switch 16 is in "off" position this pin 486 lies under a hole 490 in arm 464 and therefore it is pushed into hole 490, locking the unison switch in "off" position, thus preventing the local transmitter 2 from operating while a message is being sent to the local receiver 4. This upward movement of the free end of lever 482 also opens the connection between contacts 446, one of which is secured to an insulated member 492 extending from the end of lever 482, to open the circuit to the local signalling push-button 18, as will hereinafter be described, to prevent the local operator from signalling to a distant station while the local receiver 4 is recording a message from a distant transmitter. If unison switch 16 is in "on" position the coils 472 cannot be energized, as will hereinafter be described in connection with the circuit diagram of the machine shown in Figure 17.

In the trace of any graphic character having discontinuities in its race, it is necessary to provide some means for lifting the receiving pen 26 from the record paper 22 whenever the stylus 8 is lifted from the platen 14. In order to accomplish this, the platen 14 is made as a separate member recessed in the upper surface of the transmitter chassis 38. It is formed of sheet metal having all of its edges 15 bent at right angles, as is best shown in Figure 9, to provide rigidity to the platen. This platen 14 is pivoted at its forward edge about a horizontal axis across the front of the machine, on a pair of pivot screws 80 passing through right angle brackets 82 secured to the forward part of the upper surface of the transmitter chassis 38 and provided with lock-nuts 84 to permit locking of the pivot screws 80 after the platen position has been accurately determined and adjusted. The back of platen 14 rests on the top of the plunger 86 of a platen switch, generally indicated at 88 in Figure 9.

This platen switch 88 is designed to operate on a minute downward movement of the backward edge of platen 14 to affect a signal which is transmitted to any receivers connected to the transmitter. This signal, as will hereinafter be described, operates a pen-lifter mechanism to lower the receiving pen 26 onto the writing surface of the record strip 22 whenever the stylus 8 is pressed onto platen 14 as a graphic character is being traced on the platen. Referring to Figure 9, the plunger 86 of the platen switch 88 is attached to one end of an L-shaped bellcrank 90 pivoted about a horizontal axis 92. This bellcrank 90 is biased in a counterclockwise direction by means of a bias spring 96 which may be adjustably tensioned by means of a tensioning screw and nut 98. The depending end of the bellcrank 90 carries a contact 100 which coacts with another contact 102 secured to the end of an adjustment screw 104 threaded into a suitably insulated connection post 106 in the lower portion of the platen switch 88. The limit of motion of the bellcrank 90 in a counterclockwise direction is determined by the position of contact 102, and its motion in a clockwise direction is limited by the second adjustment screw 108 threaded through another portion 110 of the frame of switch 88. Thus, the switch 88 is normally biased to closed contact position by the spring 96 and any pressure on platen 14, as from the stylus 8 being pressed against it when a graphic character is being traced thereon, moves the plunger 86 downwardly, rotating bellcrank 90 in a clockwise direction against the tension of spring 96, breaking the connections between contacts 100 and 102. This, as will be hereinafter described, operates the pen-lifter circuit to drop the receiving pen onto the writing surface in any telescriber receivers connected to the transmitter. A triangularly-shaped connection board 112 (see Figure 5) is connected, for convenience, to the bottom side of platen switch 88 where it is readily accessible to simplify the interconnection of various parts of the transmitter mechanism.

Another terminal strip, generally indicated at 7, is also secured to the back of the transmitter chassis 38 to facilitate the connecting of the transmitter 2, and through the transmitter the receiver 4, to the external transmission circuits leading to distant transmitters and receivers.

Referring to Figure 5, which is a bottom plan view of the transceiver shown in Figure 1, the rotary control shafts 46 and 54 shown projecting into the interior of the transmitter chassis 38 at the left and right-hand sides, respectively, are the rotary control shafts shown projecting above the transmitter chassis 38 at the right and left-hand sides, respectively, in Figure 3. These control shafts 46 and 54 are connected to rotary contact arms 114 and 115, respectively, carrying roller contacts 116 at their outermost ends which make continuously variable contact with windings 123 of two auto-transformers or inductive potentiometers, generally indicated at 117 and 119. These auto-transformers 117 and 119 are constructed in the form of two concentric quadrants 118 and 120 of suitable magnetic material connected at both ends to form closed magnetic circuits by yokes 124. The concentric quadrants 118 and 120 are surrounded by windings 121 and 123, respectively. Connection strips 126 are provided between the windings 121 and 123 for suitably connecting the transformers 117 and 119 in the telescriber circuit, and flexible pigtail connections 128 are attached to contact arms 114 and 115 to provide low resistance connections between roller contacts 116 and the telescriber circuit elements, as will be hereinafter described in connection with the wiring diagram shown in Figure 17. These inductive potentiometers 117 and 119 provide two A. C. voltages determined by the positions of the rotary contacts 116 on the windings 121, each of which varies as a function of the variation in the value of one of the coordinates of the graphic character being traced by stylus 8.

A "busy" relay 130, also mounted on the underside of the transmitter chassis 38, is interconnected with the circuit of the signal lamp 20 so as to energize this lamp when a distant transmitter is signalling to the receiving portion 4 of the transceiver illustrated, as will be hereinafter described.

Figures 17, 18:
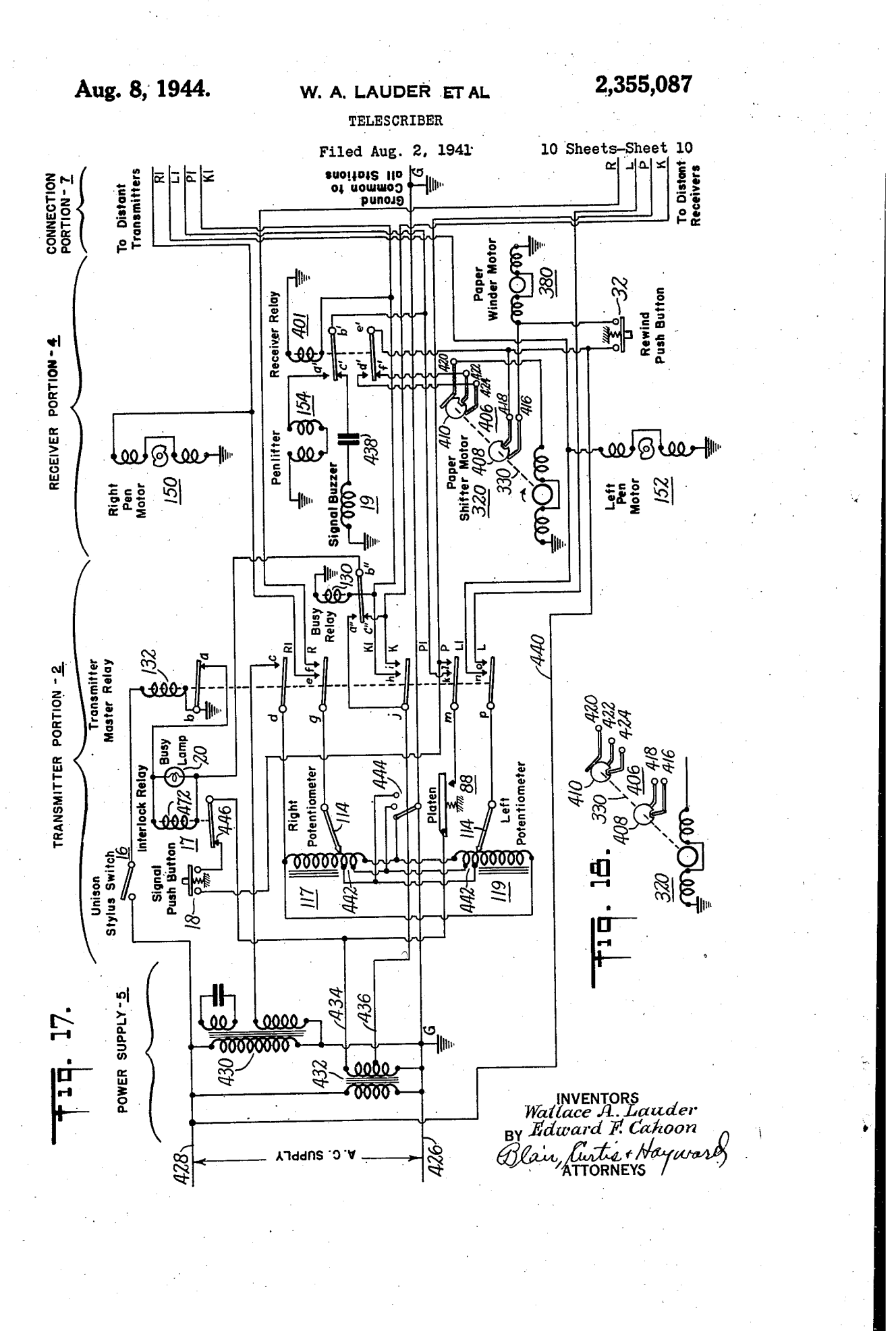

A transmitter relay 132, also mounted on the transmitter chassis 38, suitably interconnects and actuates the various circuit elements of the transceiver when it is energized by actuation of the unison switch 16 in the manner which will be more clearly understood when reference is made to the wiring diagram in Figure 17. The transmitter chassis 38 is also provided with a multiterminal plug 136 adapted to be inserted into a corresponding connector receptacle 137 whereby the various circuit elements of the receiver portion 4 of the transceiver are connected to the transmitter portion 2 and thence to the external lines connected to terminal strip 7, so that the receiver portion 4 of the transceiver may be detached and completely disconnected from the transmitter portion 2, if desired.

Referring to Figures 4, 5, 6, 9, 12, and 13, the receiver portion 4 of the transceiver is comprised essentially of two receiver pen driving motors, generally indicated at 150 and 152, which convert the two variable A. C. voltage signals received from the transmitting potentiometers 117 and 119 into rotary mechanical motions, which motions are combined through the linkages 27 and 28 (see Figure 1) to move the pen 26 to trace on the paper record strip 22 the graphic characters being transmitted. The receiver 4 also includes a pen-lifter mechanism, generally indicated at 154, for lifting the pen whenever a discontinuity occurs in the trace of the graphic character being transmitted, and a paper handling mechanism, shown in skeletonized diagrammatic perspective in Figure 12, for moving the paper strip 22 through the machine in predetermined increments.

All of the elements of the receiver portion 4 are mounted on a rectangular frame having longitudinal members 156 and 158 extending across the machine and secured to end brackets 162 and 164 which in turn are bolted to rearwardly extending portions 160 of the transmitter chassis 38 by means of screws 168. Thus, by removing the screws 168 and removing the plug 136 from the multiple connector 137, the entire receiver portion 4 of the transceiver can be disconnected and removed from the transmitter portion 2.

The receiver motors 150 and 152 are bolted to oblique angle brackets 170 and 172 secured at either end of the longitudinal frame members 156 and 158. The upper arms of these brackets 170 and 172 slope rearwardly at an angle which determines the slope of the writing platen 23 and the paper record strip 22, and therefore the slope of the front of the receiver portion 4, because the linkages 27 and 28 and the pen 26 are so secured to these motors that they move in a plane perpendicular to the drive shafts of these motors. The rest of the receiver mechanism is secured to two vertical parallel frame members 176 and 178 provided with suitably angled brackets 180 and 182 which are bolted to the rear faces of the motors 150 and 152 so as to hold the plates 176 and 178 vertically and parallel to each other at the rear of the machine, as can best be seen in Figures 4 and 6. Most of the paper handling and shifting mechanism is secured to these vertical frame members 176 and 178, as will be hereinafter described.

Figure 13:
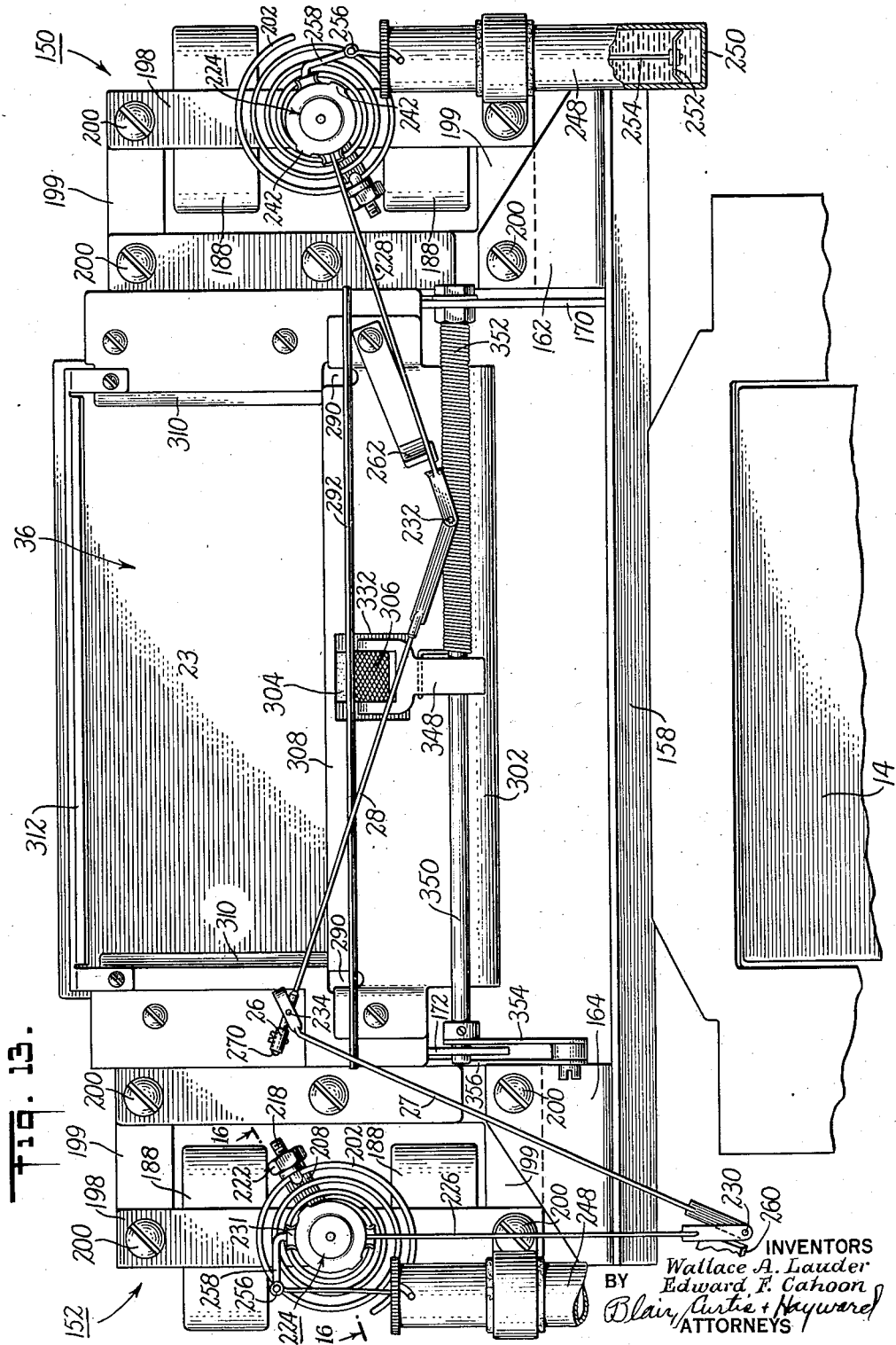
Figure 13 is an enlarged oblique section of a portion of the receiver section of the machine, taken on line 13—13 of Figure 4.
Figure 14:
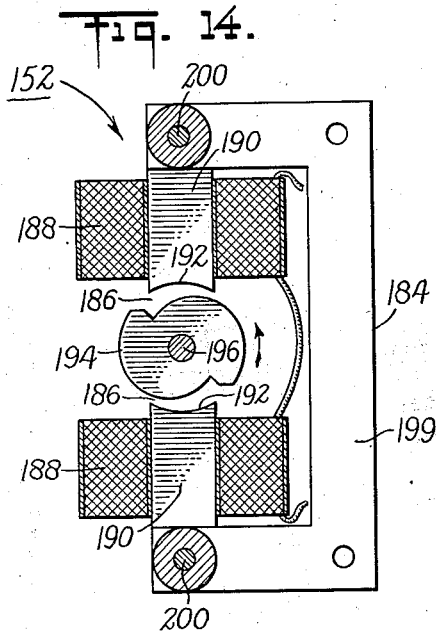
Figure 14 is an enlarged section through one of the receiver motor elements, taken on line 14—14 of Figure 4.

Referring to Figure 13, showing an enlarged plan view of the writing mechanism of the receiver 4 taken in the direction of arrows 13—13 in Figure 4, the pen driving motors 150 and 152 are reluctance torque motors with specially shaped rotors 194 designed to produce a linear relationship between the magnitude of the applied A. C. voltage and the angular position of the rotor when working against a load whose torque varies inversely with the angular position of the rotor. As can best be seen in the cross-sectional view of motor 152 shown in Figure 14, these motors have a rectangularly shaped magnetic field structure 184, preferably made of laminated silicon steel and held together by clamping frame plates 199 clamped together through bolts 200. One side of the magnetic field structure 184 is provided with an air gap 186, thus forming pole pieces 190 on either side thereof. Field coils 188, wound around these pole pieces 190, are connected in series across the lines from the transmitter, as will be hereinafter described in connection with the wiring diagram of the instrument shown in Figure 17. The faces 192 of the pole pieces 190 are concave in shape to receive the rotor 194. The rotor 194 is made of a stack of laminations of suitable magnetic material, such as silicon steel, clamped together and suitably secured to a motor drive shaft 196 which shaft is suitably journaled in bearing plates 198 secured to studs extending from the clamping plates 199 of the field structure 184 parallel to the pole pieces 190 as above described. The rotors 194 are given a perdetermined shape, for example that shown in Figure 14, so as to provide the motor with a straight line characteristic relationship, as above-mentioned. A spiral spring 202 is provided to bias shaft 196 to a normal position such that the rotor 194 bears the relationship to the pole faces 192 shown in Figure 14 and to provide a torque opposing rotation of the rotor 194. One end of the spiral spring 202 is secured to a collar 204 attached to the shaft 196 by means of a set screw 206, and the other end is clamped to a right angle bracket 208 which is adjustably secured to the front bearing plate 198 by means of a nut 210 threaded onto a bearing sleeve 212 secured to the bearing plate 198, as may be more readily seen in Figure 16, which shows an enlarged view of this construction. Bracket 208 is suitably angularly positioned with respect to bearing plate 198 so as to position the rotor 194 in its normal angular position with respect to the pole faces 192, as shown in Figure 14. A collar 214 is attached to shaft 196 by means of a set screw 216 so that the shaft 196, and therefore the rotor 194, may be suitably positioned longitudinally with respect to the field structure 184. In order to provide means for adjusting the length and therefore the torque of spring 202, a clamping arrangement is provided on the bracket 208 for clamping the spring 202 to accurately determine its active length. This clamping means comprises a bolt 218 passing through the bracket 208 and having a hole 220 in one end thereof through which the end of the spring 202 passes. A nut 222 is threaded onto the bolt 218 on the other side of the bracket 208 whereby any portion of the end of the spring 202 can be clamped against the bracket 208. In operation, when the field coils 188 are energized, the rotor 194 of the reluctance motor thus formed, due to its configuration, tends to rotate in the direction shown by the arrow in Figure 14 in an effort to reduce the air gap between the pole faces 192 and the periphery of the rotor 194, and thus reduce the reluctance of the magnetic circuit 184. This rotation, however, is opposed by spring 202, and therefore the angular rotation of the rotor is a function of the value of the voltage across the coils 188 and increases as this voltage increases. In the embodiment shown, the special form of the rotor 194 causes this increase to be linear with respect to voltage.

Referring to Figure 13, the shafts 196 of the receiver reluctance motors 150 and 152 are connected, respectively, through vibration damping hubs, generally indicated at 224, flat resilient metal strips or links 226 and 228, mounted edgewise, and pivots 230 and 232, to the pen moving links 27 and 28 which are pivotally joined at 234 at the point where the pen 26 is attached to the link 28. Inasmuch as A. C. is applied to the coils 188 of the motors 150 and 152, an oscillation of double the frequency of the A. C. voltage is produced in the shaft 196. This oscillation or "nascence" is helpful in overcoming the static friction of the motors and the pen linkage system, but its magnitude may be so great as to cause the pen 26 to make an oscillatory line instead of a smooth curve in tracing the graphic character being received. The vibration damping hubs 224 and the resilient metal links 226 and 228 are provided to attenuate this vibration between the motor shaft 196 and the pen 26.

Figure 15:
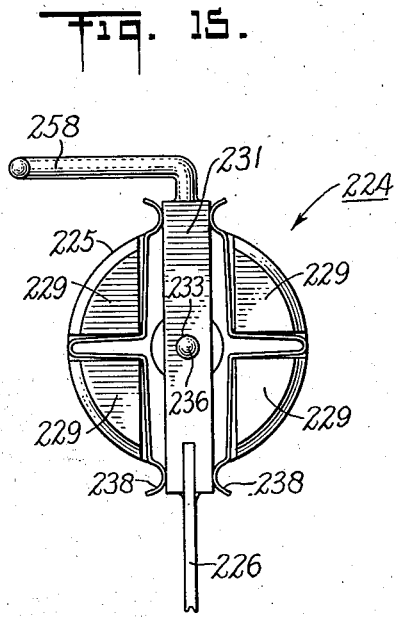
Figure 15 is an enlarged section of the hub connecting the shaft of the motor shown in Figure 14 to the receiver pen linkage, taken on line 15—15 of Figure 4.
Figure 16:
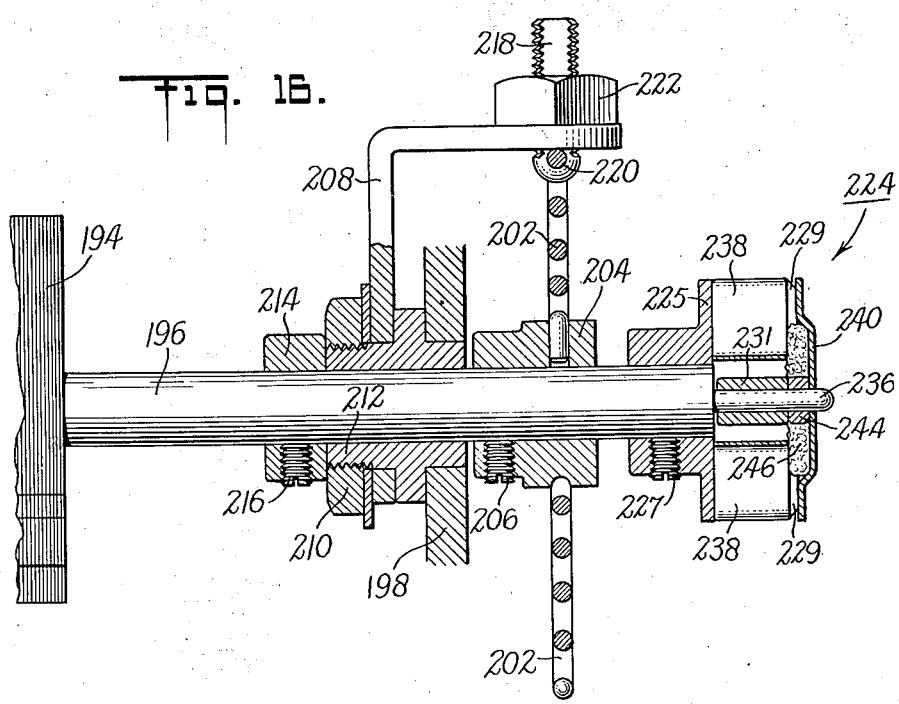
Figure 16 is an enlarged section of the receiver motor shaft, bearing, bias spring, and connection hub, taken on line 16—16 of Figure 13.

The specific construction of the vibration-damping hubs 224 can be more readily seen in the enlarged cross-section shown in Figures 15 and 16. A flange member 225 is secured to shaft 196 by a set screw 227. This flange member 225 is provided with four projections 229 forming a cross-shaped recess in the outer face of the flange, as shown in Figure 15. The flat metal link 226 terminates in a rectangular block of metal 231 provided with a hole 233 in the center thereof which fits over a pin 236 projecting from the end of shaft 196. Two resilient metal strips 238 are formed in the shape of T-shaped springs and slipped into the recesses formed by the projections 229 so as to hold the metal block 231 in the center of the widest recess, as shown in Figure 15. A sheet metal cap 240 provided with two spring tabs 242 (see Figure 4) fits over the end of the pin 236, covering the end of the hub member 224 and resting on a small metal collar 244 which is surrounded by an oil-soaked felt washer 246, as is shown more clearly in Figure 16.

In order to inhibit any tendency of the pen 26 to overtravel, oil dashpots 248 are connected to the pin linkage system. Referring to Figure 13, each of these dashpots 248 is formed of a metal cylinder 250 within which is positioned a piston-like member 252 attached to a piston rod 254, the end of which is pivotally secured at 256 to a wire lever arm 258 projecting from the end of the metal hub block 231 opposite the end to which the flat linkage member 226 is secured, as can best be seen in Figure 15. In addition, these oil dashpots 248 also provide additional damping to prevent the A. C. oscillations of the motors from producing unwanted motion of the pen 26.

As in the case of the transmitter portion 2 of the transceiver, stops 260 and 262 are provided in the receiver portion 4 to contact linkage members 226 and 228, respectively, at one end of their range of motion, when the rotors 194 are in their normal position shown in Figure 14, to normally hold the pen in its neutral or "unison" position shown in Figure 13. Thus, the pen 26 is normally held in the same position with respect to the receiver writing area 36 that the stylus 8 assumes with respect to its writing platen 14 when the stylus 8 is positioned at the unison switch 16, as shown in Figure 3.

In the embodiment shown, the pin 26 writes with a fluid ink which is stored in a reservoir 266 (see Figure 6), connected by a tube 268 to a small aperture 270 located at the neutral or "unison" position on the receiver. Thus, the pen is dipped into the hole 270 and filled by capillary action each time the pen 26 rests in the unison position, i. e., each time the transmitter stylus 8 is returned to the unison switch 16 and operates it to "off" position.

As above-mentioned, the receiver 4 is provided with a pen-lifting arrangement 154 for lifting the pen from the platen 23; that is to say, from the paper strip 22 passing over this platen, whenever a discontinuity occurs in the trace of the graphic character being transmitted. Referring to Figures 6, 7, 9, and 13, this pen-lifting mechanism 154 comprises two series-connected electromagnets 272 provided with a magnetic yoke 274 connecting their upper ends and mounted on the back of the platen 23 to form a U-shaped magnetic circuit with an air gap at the bottom. The free ends of a U-shaped armature supporting bracket 275 are pivoted on pins 276 at each side of the yoke 274 at the top of the electromagnets 272. An armature 278 is secured to the base of this U-shaped bracket 275 and depends adjacent the air gap of the U-shaped magnetic structure formed by yoke 274 and electromagnets 272, as shown in Figure 9. The armature supporting member 275 is so shaped and the pivot pins 276 are so positioned that the armature 278 normally is positioned slightly to the rear of the air gap at the bottom of the electro-magnets 272. The armature supporting member 275 also carries a horizontal cross bar 280 at its lower end. Two forwardly projecting wire members 282, bent as shown in Figure 7, are secured to either end of the cross bar 280 by means of collars 284 and set screws 286. These forwardly projecting members 282 pass through slots 290 in the platen member 23 and support a horizontal knife-edged cross bar 292 which passes under the pen links 27 and 28 along the lower edge of the writing area 36 of the platen 23 and is of sufficient length to be under these links 27 and 28 regardless of the position of the pen 26 over the platen 23. This pen-lifting bar 292 is so secured to the horizontal cross bar 280 attached to the armature supporting member 275 of the pen-lifter relay 154 that it does not contact the pen driving linkage arms 27 and 28 when the pen is moving over the platen surface 23 as long as the windings 272 of the pen-lifting mechanism 154 are deenergized. However, when the electromagnets 272 are energized, the armature is pulled forwardly so that the armature supporting member 275 moves counterclockwise, as shown in Figure 9, about the pivots 276 until the armature 278 is immediately beneath the pole tips of the electro-magnets 272. This motion of the armature 278 is sufficient to move the pen-lifting bar 292 forwardly so that it lifts the pen 26 from the platen 23 regardless of the position of the pen with respect to the platen.

As above-mentioned, the transmitter portion 2 is provided with a platen switch 88, normally closed but which opens when the stylus 8 is pressed against the platen 14 to trace a graphic character to be transmitted. As will hereinafter be described, opening the platen switch 88 by this stylus pressure opens the circuit connected to the windings of the electro-magnets 272 of the pen-lifter relay 154 in the receiver 4. When the machine is energized, this circuit is normally closed and therefore these windings are normally energized, thereby holding the armature 278 in its forward position and thus the pen-lifter bar 292 in its most advanced position so that the pen 26 is normally held above the surface of platen 23. However, when writing commences at the transmitter station by pressure of the stylus 8 on the platen 14, thus opening the platen switch 88, this circuit to the windings of magnets 272 is deenergized and the armature 278 falls away from its forward position pivoting about the pivots 276, thus pulling the pen-lifting bar 292 to its retracted position and lowering the pen 26 onto the paper strip 22 passing over the platen 23 so that the graphic character being transmitted may be recorded thereon.

The receiver portion 4 of the transceiver also includes paper handling mechanism for feeding the record strip 22 from a supply roll 294 through the machine over the platen 23 past the window 24 and to the wind-up roll 31 for storing the received and transmitted messages. This paper handling mechanism is designed to advance the strip 22 in increments equal to the height of the platen 23 so that, after a complete message is written on the platen by the pen 26, the pen is returned to the neutral or "unison" position, and the machine is deenergized by moving unison switch to "off" position, the entire message is moved up out of the writing area 36 by a single operation of the paper handling mechanism. This instantly clears the writing area 36 as soon as transmission is completed and still permits the message or character being transmitted to be instantly viewed in its entirety. In addition, in the embodiment shown, the paper handling mechanism is provided with a rewinding mechanism, whereby any length of the record strip 22 wound on the rewind roll 31 may be unwound to refer to some earlier message and automatically rewound by pushing button 32 on the front of the machine.

Figure 12:
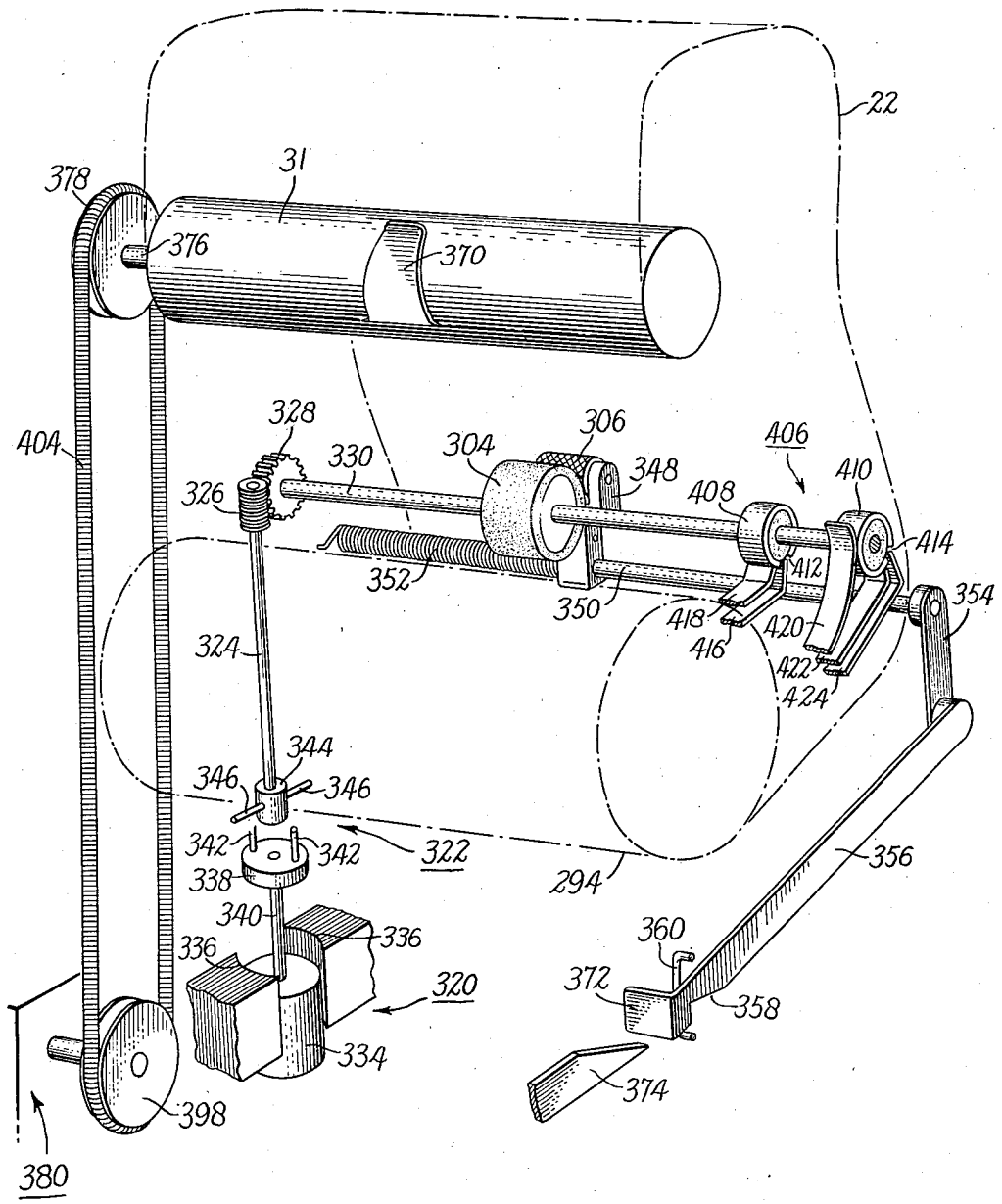
Figure 12 is a skeletonized schematic perspective view of the record paper handling mechanism of the telescriber shown in Figure 1.

The major portion of the paper handling mechanism is mounted behind the platen 23 and between the two parallel vertical frames 176 and 178, as shown in Figures 6 and 9, but its essential details and principle of operation may be more readily understood by referring to Figure 12, which shows a skeletonized perspective of the principal elements of this paper handling mechanism. The supply roll 294 (not shown in Figure 6) is mounted on a shaft 296 rotatably supported between the vertical frames 176 and 178 by U- shaped brackets 298 secured thereto. From this supply roll 294 the record strip passes through an elongated rectangular funnel-like record guide 300 made of sheet metal which guides the record strip 22 in a smooth curve around an acute angled bend 302 under a lower horizontal guide member 308, over the platen 23 between two rollers 304 and 306 forming part of the record strip shifting mechanism hereinafter to be described, so that its edges pass under two vertical guide strips 310 and under an upper guide strip 312. These guide strips 308, 310, and 312 cause the record strip to lie flat on the platen 23 to present a smooth flat surface to the pen 26. From the upper guide strip 312 over the platen 23, the record strip passes upwardly over a supporting plate 314 behind the window 24 so that the messages transmitted or received can be clearly read by the operator, over a curved guide plate 316 in the top of the machine under the hinged top 30, and thence downwardly through a slot 319 (see Figure 3) in the back of the top of the machine housing 6 to the paper wind-up roll 31 suitably rotatably supported between the vertical frame plates 176 and 178. The curved upper guide 316 is provided with two cut-out portions 317, as may be seen more distinctly in Figure 3, in which the hinged top 30 is shown in its raised position and the paper record strip 22 is shown partially broken away, whereby the paper strip 22 may be lifted to unwind it from the wind-up roll 31 so that the operator may refer to a previous message if desired.

As above-mentioned, the paper handling mechanism is provided with a paper shifting arrangement which advances the paper strip 22 in increments exactly equal to the height of the platen 23. Referring especially to Figure 12, a paper shifter motor, generally indicated at 320, is mounted on the receiver end bracket 162 (see Figures 4, 5, and 6) and, through a clutch, generally indicated at 322, a shaft 324, worm gear 326, pinion 328, and a shaft 330, drives a rubber covered paper shifter roller 304 which is positioned behind the platen 23 and presses against the under side of the record strip 22 through an aperture 332 in the platen 23. The paper shifter motor 320 is so designed that its armature 334 normally drops below its operating position between the pole faces 333 when the motor is deenergized. When the motor is energized, the armature is immediately lifted to its normal operating position directly between the poles 336 by the magnetic pull of these poles on the armature. This upward motion of the armature 334, on energization of the motor 320, engages the clutch 322. The driving element of the clutch 322 comprises a disc 338 secured to the end of the drive shaft 340 of the motor 320. Two pins 342 project perpendicularly from this disc at diametrically opposite points near the periphery of the disc. The driven member of the clutch 322 comprises a collar 344 secured to the end of the driven shaft 324 and provided with two pins 346 secured to and extending radially from this collar 344. When the motor 320 is energized and its armature 334 moves upwardly to its operating position, the disc 338 moves upwardly so that its pins 342 engage pins 346 in the collar 344 and thus engage the clutch so that the motor 320 rotates the paper moving roller 304 through shaft 324, gears 326 and 328, and shaft 330. Thus it can be seen that the motor 320 and clutch 322 provide a positive and exact drive of the paper shifting roll 304. The clutch 322 cannot slip, and there is no possibility of an overrun of the paper drive roll 304 because the instant the motor 320 is deenergized the clutch 322 is disengaged, it being impossible for the motor armature 334 to remain in its upper position when the magnetic attraction of the pole pieces 336 is removed.

In order to insure positive traction of the rubber covered paper drive roll 304 on the paper strip 22, a serrated metal roller 306 is mounted in front of the paper strip 22. This roll 306 is pivotally mounted on a lever 348 which is secured to a shaft 350 suitably journaled in the motor supporting brackets 170 and 172 at either side of the platen 23 and extending across the bottom thereof, as shown in Figure 13. The lever 348 is biased to rotate toward the back of the machine to hold the serrated metal roller 306 against the paper strip 22 to push it against the rubber covered roll 304 by means of a long coiled torsion spring 352, one end of which is attached to the lever 348 and the other to the motor supporting bracket 170. In order to remove the pressure of the roll 306 when paper is initially threaded into the machine after a new paper supply roll 294 has been put in place, a lever 354 secured to the left-hand end of the shaft 350 extends downwardly to a pivotal connection with a second lever 356 which extends to the rear of the machine. When the lever 356 is pulled toward the rear of the machine, i. e., to the left in Figure 12, shaft 350 is rotated to move the metal roll 306 forwardly and out of contact with the paper strip 22, so that the paper strip can be readily moved between rolls 304 and 306. A slot 358 is provided in the lever 356 to coact with a U-shaped guide and latch member 360 attached to the vertical frame plate 178 (see Figures 6 and 7), so that the roll 306 may be latched in release position to free both of the operator's hands for threading the new record strip into the machine.

The take-up roll 31 is detachably mounted in the machine so that when the record strip 22 is entirely covered with messages and wound onto this take-up roll it may be removed to keep these messages as a permanent record. One end of this take-up roll 31 is provided with a coupling 383, as shown in Figure 19, which coacts with a blade-like projection on the end of a pulley shaft 376 which carries a driven pulley 378 suitably rotatably supported between the vertical frame plate 176 and a U-shaped bracket 377 secured thereto, as shown in Figure 6, driven by a paper wind-up motor, generally indicated at 380, as will hereinafter be described. The other end of the take-up roll 31 is provided with a pin 381 (see Figure 19), shown in dotted lines in Figure 6, which fits into a recess in the end of a rod 382 slidably mounted on the vertical frame member 178. This rod 382 is normally biased in a position to support the take-up roll 31 by means of a coiled spring 384 compressed between the frame member 178 and a pin 386 passing through the rod 382. The other end of the rod 382 is attached to one end of a lever 390 which is pivoted at its other end to a projecting post 392 attached to the end frame member 178. A push rod 394 passes through the end frame member 178 and is pivotally coupled to the center of the lever 390, as shown in Figure 6. Thus, when the push rod 394 is pushed toward the vertical frame member 178, rod 382 is moved to the right (in Figure 6) to withdraw rod 382 from pin 381 and thereby release the take-up roll 31.

Incidentally, it is timely to mention at this point that the machine is so designed that all operations required in inserting and threading a new supply of record paper into the machine can be carried out from the rear of the telescriber through a door 362 formed in the rear of the housing 6 (see Figure 9). This door is provided with a spring clip member 364 at its lower end which acts as a detachable hinge and with a spring latch member 366 at its upper end whereby it is detachably secured to the housing 6. A knob 368 is provided to facilitate the removal and replacement of this door 362. As can be more readily seen in Figures 6 and 9, immediately inside of this door 362 at the rear of the machine are the U-shaped brackets 298 by which the paper supply roll 294 is supported. Directly underneath these brackets 298 is the funnel-shaped paper slot 300 through which the record strip 22 may be slipped so that it passes upwardly over the platen 23, over the top of the machine, and back to the take-up roll 31 which is positioned directly above the supply roll 294. The take-up roll 31 is provided with a spring clip 370 to anchor the end of the record strip 22 to this roll 31.

In order to be sure that lever 356 is unlatched after a new record strip has been positioned in the machine so that the pressure roll 306 will press the record strip 22 into contact with the paper driving roll 304 to render the paper shifting mechanism operative, the end of lever 356 is bent to form a projection 372 extending at right angles to this lever, and a cam-like projection 374 is attached to the rear door 362, as shown in Figure 7. Thus, whenever the door 362 is closed, the cam 374 presses against the projection 362 and lifts the slot 358 out of contact with the U-shaped latch member 360 so that lever 356 is released under the tension of spiral spring 352, thus permitting the pressure roll 306 to contact the paper strip 22 and press it against the drive roll 304 as shown in Figure 9.

As above-mentioned, a paper take-up or rewind motor 380 is mounted on the lower end of the vertical frame member 176, as shown in Figure 6. This motor is connected through a flexible coupling 396 to a pulley 398 mounted on a pulley shaft 400 suitably rotatably mounted between the end frame plate 176 and a U-shaped bracket 402 secured thereto. A coiled-spring type belt 404 connects this pulley 398 with pulley 378 associated with the take-up roll 31. As will be hereinafter described, motor 380 is automatically energized each time the paper shifting mechanism operates to take up the slack in the record strip 22 as fast as the paper shifting mechanism moves the record strip past platen 23. The angular rotation of paper take-up roll 31 required for each spacing movement of the record strip 22 is relatively small, and the torque required for reeling the slack paper is also small. A direct connection between the take-up motor 380 and the roll 31 would tend to pull the record strip past the writing area 36 of the receiver 4 in spite of the pressure of friction roller 304, and result in irregular or excessive paper shifting. A slipping connection is therefore provided within the roller itself as in Figure 19. A shaft 371, suitably journaled at 373 and with its axis coinciding with the major axis of the roll 31, carries at its inner end a pair of weights 375 guided in radially extending tubes 377. These weights 375 are faced with friction material 385 and are tensioned slightly against the inner surface of the roll 31 by a spring 379. The outer end of shaft 371 carries a coupling 383 shaped to receive the blade end of shaft 376 and form a support for one end of roll 31 through shaft 371 and journals 373. This construction is such that the paper winder motor 380 accelerates quickly with very small initial load and, as its speed increases, weights 375 bear more firmly on the inner surface of roll 31 to impart the desired steady torque to the roll for moving the record strip 22. In the event that the operator wishes to consult some previous message, this slipping connection between the faces of the weights 375 and roll 31 allows the record strip 22 to be pulled through the door 30 in the top of the machine, thus unwinding some of the strip from the take-up roll 31. After the operator has finished consulting the earlier message, the portion of the record strip 22 thus pulled from the telescriber may be rewound by pressing the pushbutton 32 at the front of the machine, thus energizing motor 380 to rotate take-up roll 31.

In order to automatically shift an exact length of record strip 22 in each paper shifting operation and to automatically operate the rewind motor 380 during the paper shifting operation, an electrical contact structure is provided, generally indicated at 406 and shown enlarged in Figures 7 and 8. This contact structure comprises a pair of metal roller contact members 408 and 410 mounted on but insulated from the paper roller drive shaft 330. Roller contacts 408 and 410 have grooves 412 and 414, respectively, cut in their surface parallel to the shaft 330. Two sets of leaf spring contacts, contacts 416 and 418 associated with roller contact 408, and contacts 420, 422 and 424 associated with roller contacts 410, are secured together in the usual manner in an insulated stack construction. These two sets of contacts are supported to the rear of platen 23 through intermediate bracket 172. These contacts are shaped as shown in Figures 7 and 8. Roller contacts 408 and 410 are so secured to the drive shaft 330 relative to the leaf spring contacts 418 and 422 that the ends of these leaf springs are simultaneously poised above their respective grooves 412 and 414 at substantially the same time, whereby the electrical connection between these leaf springs and roller contacts are made and broken in a manner hereinafter to be described.

The actual operation of this paper shifting mechanism can perhaps be best understood by reference to Figure 17 which shows the schematic wiring diagram of the entire transceiver. Therefore its operation will be discussed in the following description of the operation of the entire instrument.

Referring to Figure 17, the transceiver may be considered as having four sections; a transmitter section 2, a receiver section 4, a power supply section, generally indicated at 5, and an external connection section, generally indicated at 7. The power supply section 5 (not illustrated in any of the other figures of the drawings) includes a constant voltage transformer 430, connected to any available A. C. supply, such as lines 426 and 428, which is used to supply power to the message transmitting circuit elements of the telescriber. Such a constant voltage transformer, though not essential, is desirable where the telescriber is to be operated on a supply line having any considerable fluctuation in voltage so that the voltages transmitted over the message transmitting circuit, i. e., the right and left line circuits R—1 and L—1, will vary only in accordance with the characteristics of the graphic characters being transmitted and not in response to fluctuations of the power supply voltage. The power supply section 5 also includes a second transformer 432 connected across the supply lines 426 and 428 to provide lower voltages for operating control signals and relays. In the embodiment shown, this transformer 432 provides two voltages through terminals 434 and 436. Terminal 434 supplies power for operating the pen-lifter circuit, and terminal 436 for operating interlock relay 17, "busy" relay 130, and a receiver relay, generally indicated at 401. This latter relay 401, mounted in the base of the receiver portion 4 of the transceiver, as shown in Figure 5, controls the automatic operation of the paper shifting mechanism, energization of the pen-lifter mechanism, and operation of the signal buzzer. The master transmitting relay 132, the paper shifter motor 320, and the paper winder motor 380, are all operated from the full voltage of the power supply lines 426 and 428. One side of the constant voltage transformer 430, the control voltage transformer 432, and all elements of the transcriber apparatus are connected to one side of the power supply line 426 which is connected to a ground circuit G. This ground circuit G is common to the entire telescriber system.

The connection portion 7 comprises the terminal board of the telescriber through which it is connected to four lines, R—I, L—I, P—I, and K—I leading to a distant transmitting station similar to the telescriber transceiver herein described; a ground line G, mentioned above, common to the entire system; and four lines R, L, P, and K, leading to one or more distant receiving stations such as the receiver portion 4 of the transceiver herein described.

The low voltage ends of the right and left line inductive potentiometers 117 and 119 are each provided with a set of similar taps 442. The corresponding taps of these sets are connected together, and a switch 444 is provided to selectively connect these taps to the ground line G. This arrangement permits the transmitter to be compensated so that the proper values of voltage are transmitted over lines L and R to the distance receivers regardless of the number of such receivers connected as a load across these lines.

When a message, or series of graphic characters, is to be transmitted to some distant receiver or receivers, signal push-button 18 is depressed. This closes a circuit from the terminal 434 of the signal transformer 432, through the contact 446 of the interlock relay 17, through the contacts of the signal push-button 18, to the external line P, which in the distant receiver is equivalent to the incoming line P—I in Figure 17. Line P—I is connected through contact arm b' of receiver relay 401 to contact c', and thence through an isolating condenser 438 to one side of the winding of the receiver signal buzzer 19, the other side of which is connected to ground line G. Thus, the signal buzzer of the distant receiver is actuated by pressing the signal push-button 18 to notify the operator at the distant receiver that a message is to be transmitted. The operator at the local station then moves the unison switch 16 to "on" position with the stylus 8. This closes the contacts of the unison switch 16 and completes a circuit to energize the winding of the transmitter master relay 132 which moves all of the contact arms b, d, g, j, m, and p of this relay from their normal positions, shown in Figure 17, to their alternative positions. Thus, operation of the transmitter master relay 132 opens the contacts a and b, in series with the winding of the interlock relay 17 and the "busy" lamp 20, thus rendering the locking relay inoperative and preventing a distant station from locking the local transmitter 2 by transmitting a message to the local receiver 4. Likewise, connection is made between contacts c and d of relay 132 which connect the right and left line inductive potentiometers 117 and 119 to the secondary winding of the constant voltage transformer 430, thus energizing these elements, so that two variable message voltages corresponding to the coordinates of the graphic characters to be transmitted may be developed between contact arms 114 and ground G. At the same time connection is made between contact arm g and contacts e and f of relay 132 to connect the variably positioned contact 114 of the right line inductive potentiometer 117 to lines R—I and R leading to distant transmitter and receiver stations, and also to the right pen motor 150 of the local receiver 4. Similarly, connection is made between contact arm p and contacts n and o of relay 132 to connect contact arm 114 of the left inductive potentiometer 119 to lines L—I and L leading to distant stations, and also to the left pen motor 152 of the local receiver 4. These last two connections energize the pen driving motors 150 and 152 of the local receiver 4 so that the pen 26 will make a record on the record strip 22 of the graphic characters being traced on the platen 14 by the stylus 8. Energization of relay 132 also makes a connection between contact arm j and contacts h and i. This energizes the local "busy" relay 130 through a circuit from terminal 436 of transformer 432 to line K—I, and also energizes the receiver relay 401. The connection to line K—I also energizes the "busy" relays at the distant transmitting stations to prevent them from sending a message to the local receiver during the time when the local transmitter is operating. Likewise, by connecting line K to tap 436 of transformer 432 by a connection in the distant receivers similar to the connection between contacts b'' and c'' of the "busy" relay 130 in the local receiver, their "busy" lamps, similar to lamp 20, and the energizing windings of their interlock relays, similar to windings 472 of relay 17, are energized to light these "busy" lamps to indicate that a signal is being transmitted to those stations and to lock those stations so that they cannot transmit during the time when the message is being sent from the local transmitter. Energization of the receiver relay 401 by closure of contacts j and h closes the contact between its contact arm b' and contact a' thereby closing the circuit to the pen-lifter magnet 154 so that it is in condition to be energized when a connection is made between contacts m and k of relay 132, as will be hereinafter described. Simultaneously, the circuit through contacts b' and c' to the local signal buzzer 19 is broken so that it cannot be operated while the local receiver is in operation. Further, energization of receiver relay 401 breaks the connection between its contacts e' and f' and makes the connection between its contacts e' and d' to operate the paper shifter mechanism, as will be hereinafter described. A further operation caused by the energization of the transmitting master relay 132 is to make a connection between its contact arm m and contacts k and l. This closes the circuit from tap 434 on the signal transformer 432 through the platen switch 88 to lines P—I and P, thus energizing these lines. The energization of line P—I energizes the pen-lifter magnets 154 of local receiver 4 through contacts a' and b' of relay 401, while energization of line P energizes the pen-lifter magnets of the distant receiver or receivers.

As was described above, when the windings of the pen-lifter structure 154 are energized, its armature 278 is moved forward, thus moving pen-lifter bar 292 away from the platen 23 (Figures 6, 7, and 13) to lift the pen linkages 27 and 28 so that the pen 26 is lifted out of contact with the record strip 22. When the operator presses the stylus 8 on platen 14 to commence the trace of the characters to be transmitted, this separates the contacts 100 and 102 of the platen switch 88, thus opening the circuit to the local pen-lifter coil 272, as well as the circuit to the coils of the pen-lifter mechanisms in the distant receivers, causing the pen-lifter bar 292 to retract and thus drop the receiver pen 26 on the record strip 22 to put it in position for writing. Whenever the stylus 8 is removed from the platen 14, i. e., whenever a discontinuity occurs in the trace of the character being transmitted, the pen-lifter circuit is once more energized, thus lifting the pen 26 from the record strip to make a corresponding discontinuity in the record.

Now that the operation of the telescriber in transmitting a message has been described, the operation of the paper shifting mechanism can be more readily understood. The normal inoperative condition of the rotary contact structure 406 of this mechanism is that shown schematically in Figure 17. Inasmuch as there is no connection between contact springs 416 and 418 because contact spring 418 is poised over the groove 412 in roller contact 408, there is no connection through line 440 from line 428 of the A. C. supply through paper winder motor 380 to ground. Thus motor 380 is inoperative. Likewise, contact spring 422 is poised over groove 414 in roller contact 410, and contacts d' and e' of receiver relay 401 are open, so that the circuit from the paper shifting motor 320 through line 440 to line 428 of the A. C. supply is broken. Therefore, paper shifting motor 320 is deenergized. However, when the unison switch 16 is closed, thus energizing the transmitter master relay 132 closing contacts j and h to energize receiving relay 401, connection is made between the line 428 of the A. C. supply, through line 440 and contact arm e' to contact d' of receiver relay 401. This closes a circuit through contact spring 424, roller contact 410, and contact spring 420 to the paper shifting motor 320. This energizes motor 320 causing the clutch mechanism 322 to engage and starts rotation of shaft 330 in the direction of the arrow in Figure 17. However, only a slight rotation of shaft 330 moves roller contact 410 so that contact 424 is poised over the groove 414. This breaks the circuit to motor 320 and immediately stops rotation of shaft 330, thus leaving contact 424 in the position shown in Figure 18. In the meantime, contact 422 has made contact with the periphery of roller contact 410, but, because receiver relay 401 is still energized and therefore the circuit between its contacts e' and f' is broken, this cannot serve to energize motor 320. At the same time, contact arm 418 will have made contact with the periphery of roller contact 408, but, inasmuch as roller contact 408 has moved to the position shown in Figure 18, contact arm 416 is poised over the groove 412 so that at no time will the paper winder motor 380 have been energized during this operation.

When the operator at the local transmitter 2 has completed tracing the characters of his message on the platen 14, or, if he has completely filled up the platen and wishes to continue his message on a fresh area of the record strip 22 by advancing the record strip by means of the paper shifting mechanism, he operates the unison switch 16. If he has completed his message, he moves it to "off" position and leaves it there, but if he wishes to continue, he merely moves it momentarily to "off" position and then returns it to "on" position. In either case, the transmitter master relay 132 is deenergized, at least momentarily, thus breaking the connection between its contacts j and h and so deenergizing the receiver relay 401. Insofar as the paper shifting mechanism is concerned, this breaks the connection between contacts d' and e' and makes the connection between contacts e' and f'. Inasmuch as the contact structure 406 is now oriented, as shown in Figure 18, this completes the circuit from the line 428 of the A. C. supply, through line 440, contacts e' and f' of receiver relay 401, contact arm 422, roller contact 410, and contact arm 420 to the paper shifting motor 320, thereby energizing this motor so that clutch 322 is once more engaged and shaft 330 starts to rotate. As above-mentioned, shaft 330 rotates the rubber-covered paper driving roll 304 against the paper strip 22 so that the paper strip starts to move from the supply roll 294 up over the platen 23. At the same time, rotation of the shaft 330 also rotates the roller contacts 408 and 410 and this rotation continues until contact arm 422 rides off of the periphery of roller contact 410 and is once more poised over the groove 414 in this roller contact, as shown in Figure 17. This automatically breaks the circuit to the paper shifter motor 320, thus deenergizing it and causing clutch 322 to immediately disengage. This stops the rotation of the paper drive roller 304 and therefore the motion of the record strip 22. During this operation, roller contact 408 is also rotating with the shaft 330, so that both contact arms 416 and 418 ride onto the periphery of contact 408, thus closing the circuit between these contacts. This energizes the paper winder motor 380 and causes it to drive the take-up roll 31 so that the paper strip, moved upwardly past the platen 23 by the paper drive roller 304, is wound up on the take-up roll 31. At the same time that contact arm 422 rides off of the periphery of contact roller 410, breaking the circuit to the paper shifter motor 320, contact arm 418 also rides off of the periphery of contact roller 408 and is poised over the groove 412 in this roller, thus simultaneously breaking the circuit to the paper winder motor 380 to deenergize it and stop rotation of the take-up roll 31. This returns the entire paper shifting apparatus to the condition in which it was at the time that the operator at the local transmitter 2 commenced the transmission of his message, except that the paper strip 22 has been moved upwardly a predetermined distance equal to the height of the platen 23, thus clearing the platen for the recording of another message. If, as above-mentioned, the operator wishes to send a further message, the paper shifting mechanism will repeat the cycle of operation just described.

If a message is to be received from a distant transmitter connected to lines R—1, L—1, P—1, and K—1, the operation of the local receiver 4 is substantially identical with its operation when it was connected to the local transmitter 2 while the local transmitter was transmitting a message to distant receivers through lines R, L, P, and K. When the operator at the distant transmitter pushes his signal push-button, this energizes line P—I in the local instrument which is connected through contact arm b' and contact c' of receiver relay 401 to the signal buzzer 19, thus operating the buzzer to notify the local operator that a message is to be transmitted to the local receiver portion 4. When the distant transmitter is turned on through its unison stylus switch, line K—I is energized, thus energizing receiver relay 401 in the local receiver 4, which in turn disconnects signal buzzer 19 and energizes the pen-lifter mechanism 154 by moving contact arm b' from contact c' to contact a'. Similarly, contact arm e' is moved from contact f' to contact d', momentarily energizing paper shifter motor 320 to rotate the paper shifting roller contact assembly 406 from the position shown in Figure 17 to that shown in Figure 18. This puts the paper shifting mechanism in "set" condition preparatory to operation through the remainder of its cycle of operation whereby the paper strip 22 is advanced a predetermined distance. Upon completion of the transmission of a message from the distance transmitter, receiver relay 401 is deenergized, thus moving contact arm e' to contact f' to once more energize paper shifter motor 320 whereby the paper shifting contact assembly 406 is rotated to complete its cycle of operation and resume the position shown in Figure 17, and at the same time the paper shifter roller 304 is rotated to move the paper strip 22 ahead a predetermined increment equal to the height of platen area 36.

From the foregoing it will be seen that there is herein provided a telescriber machine which achieves the object of this invention, including many practical advantages. The parts are compactly arranged for convenient accessibility and the machine is convenient to operate and thoroughly practical throughout.

As many possible embodiments may be made of the above invention without departing from the scope thereof, it is to be understood that all matter herein set forth or shown in the accompanying drawings is to be interpreted as illustrative and not in a limiting sense.

We claim:

1. In a telescriber adapted to make a record on a strip of record material, the combination of, a record strip, means for moving said record strip in increments in a given direction, two rotary telescriber elements, first and second levers each secured to the rotary portions of one of said telescriber elements and extending approximately in a direction opposite to the direction of motion of said strip, third and fourth levers pivotally connected to the free ends of said first and second levers, respectively, and extending therefrom generally in the direction of movement of said strip, means pivotally joining their free ends, and graphic-character tracing means operatively connected to said pivotal means, whereby the portion of said record strip immediately ahead of the most advanced point in the direction of movement of said strip reached by said tracing means during operation of said telescriber may be inspected without being obstructed by said levers and may be easily removed from the telescriber without interference from said levers.

2. A telescriber system, comprising, in combination, a telescriber transmitter chassis, two rotatable transmitting elements mounted oppositely on the left and right-hand sides of said chassis and each adapted to produce an electric signal proportional to a function of one of the coordinates of the trace of graphic characters to be transmitted, a tracing surface mounted between said elements, stylus means for tracing on said surface the graphic characters to be transmitted, a first linkage member attached to each of said elements and extending toward the bottom of said tracing surface, a second linkage member pivotally attached to each of said first linkage members extending toward the top of said tracing surface and pivotally attached to each other and to said stylus means, transmission channel means for conveying said signals to a telescriber receiver station, a telescriber receiver chassis, two rotatable telescriber receiver motors mounted oppositely on the left and right-hand sides of said receiver chassis and connected to said transmission channel means, a recording platen supported between said motors, means for moving a record strip upwardly across said platen, means for making a record on said record strip, a third linkage member connected to each of said receiver motors and extending toward the bottom of said platen, and a fourth linkage member connected to each of said third linkage members extending toward the top of said platen in the direction of motion of said record strip and pivotally joined together and to said recording means for driving said recording means over said record strip to reproduce thereon the graphic characters to be transmitted.

3. In a telescriber receiver adapted to record received telescription messages on a strip of record paper, the combination of, an approximately vertical platen, a strip of record paper, means for moving said paper strip upwardly over the surface of said platen in increments equal to the width of said platen, a paper tear-off strip mounted across the top of said platen in front of said paper strip, a telescriber receiver motor positioned on each side of said platen, a driving lever secured to the drive shaft of each of said telescriber motors and extending downwardly therefrom, a pen driving linkage pivotally secured to the free end of each of said driving levers and extending therefrom upwardly in the direction of motion of said record strip, pivotal means joining the upper ends of said pen driving linkages, and a recording pen operatively secured to said linkages at said pivotal connection, whereby the pen driving mechanism is moved upwardly from the lower edge of the platen toward but not beyond the upper edge thereof.

4. In a telescriber adapted to use a movable strip recording surface, the combination of, a record strip, means for moving said strip in increments in one direction, means for actuating said moving means, two rotary telescriber motor elements, graphic-character tracing means, linkage means connecting said motor elements and said tracing means, comprising, a first lever secured to the rotary portion of one of said motor elements and extending in a direction generally opposite to the direction of motion of said strip, a second lever secured to the rotary portion of the other of said motor elements and extending in the same general direction as said first lever, a third lever pivotally connected to the free end of said first lever and extending generally in the direction of movement of said strip, a fourth lever pivotally connected to the free end of said second lever and extending generally in the direction of movement of said strip, means pivotally joining the free ends of said third and fourth levers, means for operatively connecting said tracing means to said third and fourth levers at said pivotal connection, and means operative upon the conclusion of recording on any increment of said record strip for operating said actuating means to advance said strip by said predetermined increment, whereby the recorded increment of said record strip immediately ahead of the most advanced position of said tracing means in the direction of movement of said record strip during operation of said telescriber may be inspected and removed from said telescriber immediately after operation of said strip-moving means.

5. For use in a telescription system for transmitting and receiving facsimile traces of graphic characters and operable on A. C. power, in combination, a source of A. C. power, a pair of inductive potentiometers each comprising two concentric quadrant-shaped magnetic cores joined at their ends by radial magnetic yokes, windings surrounding said concentric cores, means connecting said windings across said source of A. C. power, an arcuate path bared along the edge of one of said windings, a shaft rotatably mounted along the axis of said concentric cores, a contact arm secured to and extending from said shaft, a moving contact mounted on said arm to coact with the bared path on said winding, and means for moving each of said contacts along their respective paths to vary the A. C. potential output developed between said contacts and one end of said windings of each of said potentiometers, respectively, in accordance with a function of the coordinates of the trace of a graphic character to be telescribed.

6. For use in a telescription system for transmitting and receiving facsimile traces of graphic characters and operable on A. C. power, in combination, a pair of torque-producing A. C. reluctance motors adapted to be rotated proportionately, respectively, to the magnitude of the A. C. potential output of an A. C. telescriber transmitter, comprising, a field structure of magnetic material forming a magnetic circuit closed except for an air gap having a circular cross-section, a field winding encircling said magnetic circuit, an armature of magnetic material rotatably supported on a shaft in said air gap, said armature having a cross-section the radius of which increases through about 180° from two diametrically opposite points on its periphery whereby the gap between said armature and said field structure gradually decreases as said armature rotates from a predetermined angular position, and resilient means biasing said armature toward said predetermined angular position and providing torque opposing rotation of said armature, means for transmitting the variable potentials from a telescriber transmitter to said reluctance motors, means for applying said A. C. telescriber signals to said motor field windings, and resolving means operatively connected to said motors and responsive to the movements thereof to recombine said functional coordinate motions whereby the trace of the graphic character telescribed is reproduced.

7. For use in an A. C. telescriber receiver for reproducing the trace of graphic characters transmitted from a distant station and operable on A. C. power, in combination, a pair of torque producing A. C. reluctance motors adapted to be rotated proportionately, respectively, to the magnitude of two A. C. telescriber signals applied thereto, each comprising, a field structure of magnetic material forming a magnetic circuit closed except for an air gap having a circular cross-section, a field winding encircling said magnetic circuit, an armature of magnetic material rotatably supported on a shaft in said air gap, said armature having a cross-section the radius of which increases through substantially 180° magnetically with respect to the field structure from two points on its periphery whereby the gap between said armature and said field structure gradually decreases as said armature rotates from a predetermined angular position, and resilient means biasing said armature toward said predetermined angular position and providing torque opposing rotation of said armature, means for applying said A. C. telescriber signals to said motor field windings, linkage members pivotally attached to each of said motors, a platen, and a tracing stylus secured to said linkage members at the pivotal connection therebetween and adapted to trace the graphic characters being telescribed on said platen.

8. For use in a telescription system for transmitting the traces of graphic characters to a distant point and operable on A. C. power, in combination, a pair of torque-producing A. C. reluctance motors adapted to be rotated proportionately, respectively, to the magnitude of the A. C. potential output of a telescriber transmitter, comprising, a field structure of magnetic material forming a magnetic circuit closed except for an air gap having a circular cross-section, a field winding encircling said magnetic circuit, an armature of magnetic material rotatably supported on a shaft in said air gap, said armature having a cross-section the radius of which increases through substantially 180° magnetically with respect to the field structure from two points on its periphery whereby the gap between said armature and said field structure gradually decreases as said armature rotates from a predetermined angular position, resilient means biasing said armature toward said predetermined angular position, means for transmitting the variable A. C. potentials from a telescriber transmitter to said reluctance motors, means for applying said potentials to said motor field windings, and resolving means operatively connected to said motors and responsive to the movements thereof proportionate to each of said coordinates, respectively, to recombine said coordinate motions whereby the trace of the graphic character being telescoped is reproduced.

9. In a telescriber adapted to use a movable strip recording surface, the combination of, a plurality of telescriber elements, a record strip, recording means adapted to produce a record trace on said strip, means operatively connecting said recording means to said telescriber elements, cyclically operable shifting means for advancing said strip in predetermined increments, setting means for preparing said shifting means for its cycle of operation, control means for energizing said telescriber elements and operating said record tracing means to produce a record on said strip, means responsive to the energization of said telescriber elements through said control means for operating said setting means, and means responsive to the next operation of said control means, deenergizing said telescriber elements, to operate said strip shifting means through one cycle of its operation and simultaneously restore said setting means to its inoperated condition.

10. In a telescriber adapted to use a movable strip recording surface, the combination of, a housing for said telescriber, a pair of telescriber elements mounted in said housing, a record strip adapted to move along a predetermined path inside said housing, guide means for confining said record strip to said path, recording means adapted to produce a record trace on said strip, means operatively connecting said recording means to said telescriber elements, cyclically operable shifting means for advancing said strip in predetermined increments including driving means adjacent to said predetermined path and contacting said strip to advance it along said path in said housing, means for disconnecting said driving means from said strip to render said shifting means inoperable, a door in said housing through which said record strip may be placed in said housing and fed into said guide means, and means responsive to the closing of said door for rendering said disconnection means inoperative.

11. In a telescriber adapted to use a movable strip recording surface, the combination of, a housing for said telescriber, a pair of telescriber elements mounted in said housing, a record strip adapted to move along a predetermined path inside said housing, guide means for confining said record strip to said path, recording means adapted to produce a record trace on said strip, means operatively connecting said recording means to said telescriber elements, shifting means for advancing said strip, including a record drive motor, control means for actuating said motor, a friction-drive roll driven by said motor and positioned tangentially on one side of said record strip, a pressure roll mounted on the other side of said record strip from said drive roll and biased toward said record strip to push it firmly into contact with said drive roll, means rendering said drive roll inoperative by retracting said pressure roll to permit insertion of a record strip therebetween, a door in said housing through which said record strip may be placed in said housing to be fed into said guide means and between said rolls, and means responsive to the closing of said door for rendering said retracting means inoperative whereby said record strip advancing means is rendered operative.

12. In a telescriber adapted to use a movable strip recording surface, the combination of, a pair of telescriber elements, a record strip, recording means adapted to produce a record trace on said strip, means operatively connecting said recording means to each of said telescriber elements, control means for energizing said telescriber elements and operating said record tracing means to produce a record on said strip, and cyclically operable shifting means for advancing said strip in predetermined increments, comprising record shifting motor means, a shaft having a normal angular position and adapted to be rotated by said motor means, a friction roller secured to said shaft and positioned to contact one surface of said record strip to move said strip when said shaft is rotated, a power supply, a first switch operated by rotation of said shaft and open only when said shaft is in said normal angular position, a second switch operated by rotation of said shaft and open only as said first switch closes when said shaft is in a predetermined angular position slightly advanced with respect to its normal angular position, and a relay responsive to energization of said telescriber elements to connect said second switch in a circuit in series with said motor means and said power supply and responsive to deenergization of said elements to connect said first switch in a circuit in series with said motor means and said power supply whereby said record shifting motor means is energized momentarily to rotate said shaft slightly to close said first switch and open said second switch when said telescriber elements are energized through operation of said control means and is again energized when said telescriber elements are deenergized to rotate said shaft and therefore said friction roller until said shaft assumes its normal angular position thus opening said first switch to deenergize said motor means.

13. In a telescriber adapted to use a movable strip recording surface, the combination of, a plurality of telescriber elements, a record strip, recording means adapted to produce a record trace on said strip, means operatively connecting said recording means to said telescriber elements, cyclically operable shifting means for advancing said strip in predetermined increments, setting means for preparing said shifting means for its cycle of operation, control means for energizing said telescriber elements and operating said record tracing means to produce a record on said strip, means responsive to the energization of said telescriber elements through said control means for operating said setting means, means responsive to the next operation of said control means, to deenergize said telescriber elements, to operate said strip shifting means through one cycle of its operation and simultaneously restore said setting means to its initial condition, means for winding-up said record strip after it moves past said recording means, motor means for driving said wind-up means, means responsive to the deenergization of said telescriber elements to energize said motor means to wind up said record strip, and means operative simultaneously with the restoration of said setting means to its initial condition to deenergize said wind-up motor means.

14. In a telescriber adapted to use a movable strip recording surface, the combination of, a pair of telescriber elements, a record strip, recording means adapted to produce a record trace on said strip, means operatively connecting said recording means to each of said telescriber elements, control means for energizing said telescriber elements and operating said record tracing means to produce a record on said strip, and cyclically operable shifting means for advancing said strip in predetermined increments, comprising record shifting motor means, a shaft having a normal angular position and adapted to be rotated by said motor means, a friction roller secured to said shaft and positioned to contact one surface of said record strip to move said strip when said shaft is rotated, a power supply, a first switch operated by rotation of said shaft and open only when said shaft is in said normal angular position, a second switch operated by rotation of said shaft and open only as said first switch closes when said shaft is in a predetermined angular position slightly advanced with respect to its normal angular position, a relay responsive to energization of said telescriber elements to connect said second switch in a circuit in series with said motor means and said power supply and responsive to deenergization of said elements to connect said first switch in a circuit in series with said motor means and said power supply whereby said record shifting motor means is energized momentarily to rotate said shaft slightly to close said first switch and open said second switch when said telescriber elements are energized through operation of said control means and is again energized when said telescriber elements are deenergized to rotate said shaft and therefore said friction roller until said shaft assumes its normal angular position thus opening said first switch to deenergize said motor means, means for winding up said record strip after it is moved past said recording means by said shifting means, wind-up motor means to drive said wind-up means, and a third switch operated by rotation of said shaft and positioned to be closed only when said first and second switches are closed whereby said wind-up means is operated simultaneously with said shifting means.

15. In a telescriber adapted to use a movable strip recording surface, the combination of, a plurality of telescriber elements, a record strip, recording means adapted to produce a record trace on said strip, means operatively connecting said recording means to said telescriber elements, cyclically operable shifting means for advancing said strip in predetermined increments, setting means for preparing said shifting means for its cycle of operation, control means for energizing said telescriber elements and operating said record tracing means to produce a record on said strip, means responsive to the energization of said telescriber elements through said control means for operating said setting means, means responsive to the next operation of said control means, deenergizing said telescriber elements, to operate said strip shifting means through one cycle of its operation and simultaneously restore said setting means to its initial condition, means for winding up said record strip after it moves past said recording means, motor means for driving said wind-up means, means responsive to the deenergization of said telescriber elements to energize said motor means to wind up said record strip, means operative simultaneously with the restoration of said setting means to its initial condition to deenergize said wind-up motor means, and manually controlled means for energizing said wind-up motor means independently of the operation of said control means or said setting means.

16. In a telescriber adapted to use a movable strip recording surface, the combination of, a plurality of telescriber elements, a record strip, recording means adapted to produce a record trace on said strip, means operatively connecting said recording means to said telescriber elements, control means for energizing said telescriber elements and operating said record tracing means to produce a record on said strip, cyclically operable shifting means for advancing said strip in predetermined increments, comprising, driving means including electric motor means for advancing said record strip, said driving means having a neutral position, first motor control means operated by said driving means to deenergize said motor means only when said driving means is in said neutral position, second motor control means operated by said driving means to deenergize said motor means only as said first motor control means energizes said motor means when said driving means is in a predetermined position slightly advanced with respect to its neutral position, and relay means responsive to operation of said telescriber control means in energizing said telescriber elements to operatively connect said second motor control means to said motor means and responsive to operation of said telescriber control means in deenergizing said elements to operatively connect said first motor control means to said motor means whereby said motor means is operated momentarily to move said driving means slightly to operate said first motor control means and to render inoperative said second motor control means when said telescriber elements are energized and is again operated when said telescriber elements are deenergized to move said driving means and therefore said record strip until said driving means assumes its neutral position thus rendering inoperative said first motor control means to operatively disconnect said motor means.

17. In a telescriber adapted to use a movable strip recording surface, the combination of, a plurality of telescriber elements, a record strip, recording means adapted to produce a record trace on said strip, means operatively connecting said recording means to said telescriber elements, control means for energizing said telescriber elements and operating said record tracing means to produce a record on said strip, cyclically operable shifting means for advancing said strip in predetermined increments, comprising, driving means including electric motor means for advancing said record strip, said driving means having a neutral position, first motor control means operated by said driving means to deenergize said motor means only when said driving means is in said neutral position, second motor control means operated by said driving means to deenergize said motor means only as said first motor control means energizes said motor means when said driving means is in a predetermined position slightly advanced with respect to its neutral position, relay means responsive to operation of said telescriber control means in energizing said telescriber elements to operatively connect said second motor control means to said motor means and responsive to operation of said telescriber control means in deenergizing said elements to operatively connect said first motor control means to said motor means whereby said motor means is operated momentarily to move said driving means slightly to operate said first motor control means and to render inoperative said second motor control means when said telescriber elements are energized and is again operated when said telescriber elements are deenergized to move said driving means and therefore said record strip until said driving means assumes its neutral position thus rendering inoperative said first motor control means to operatively disconnect said motor means, means for winding up said record strip after it moves past said recording means, motor means for driving said wind-up means, means responsive to the deenergization of said telescriber elements to render said wind-up motor means operative to wind up said record strip, and means operative simultaneously with the return of said driving means to its neutral position to render said wind-up motor means inoperative.

18. In a telescriber adapted to use a movable strip recording surface, the combination of, a plurality of telescriber elements, a record strip, recording means adapted to produce a record trace on said strip, means operatively connecting said recording means to said telescriber elements, control means for energizing said telescriber elements and operating said record tracing means to produce a record on said strip, cyclically operable shifting means for advancing said strip in predetermined increments, comprising, driving means including electric motor means for advancing said record strip, said driving means having a neutral position, first motor control means operated by said driving means to deenergize said motor means only when said driving means is in said neutral position, second motor control means operated by said driving means to deenergize said motor means only as said first motor control means energizes said motor means when said driving means is in a predetermined position slightly advanced with respect to its neutral position, relay means responsive to operation of said telescriber control means in energizing said telescriber elements to operatively connect said second motor control means to said motor means and responsive to operation of said telescriber control means in deenergizing said elements to operatively connect said first motor control means to said motor means whereby said motor means is operated momentarily to move said driving means slightly to operate said first motor control means and to render inoperative said second motor control means when said telescriber elements are energized and is again operated when said telescriber elements are deenergized to move said driving means and therefore said record strip until said driving means assumes its neutral position thus rendering inoperative said first motor control means to operatively disconnect said motor means, means for winding up said record strip after it moves past said recording means, motor means for driving said wind-up means, means responsive to the deenergization of said telescriber elements to render said wind-up motor means operative to wind up said record strip, means operative simultaneously with the return of said driving means to its neutral position to render said wind-up motor means inoperative, and manually controlled means for rendering said wind-up motor means operative independently of the operation of said telescriber control means or said record strip driving means.

19. In a telescriber adapted to use a movable strip recording surface, the combination of, a record strip, and shifting means for advancing said strip in predetermined increments, comprising a record-shifting drive shaft adapted to be rotated by a motor, a friction roller secured to said shaft and positioned tangentially to said record strip to contact one face thereof so that said strip is advanced a predetermined distance by predetermined angular rotation of said shaft, a record-shifting motor for driving said record-shifting drive shaft having an armature secured to the motor shaft and a field structure, the pole faces of which are adapted to surround said armature, bearings slidably supporting said motor shaft, biasing means normally urging said armature axially to cause said shaft to slide in said bearings to move said armature out of its normal operating position between the pole faces of said field structure, a driving clutch member secured to said motor shaft on the end opposite to the direction in which said shaft is urged by said biasing means, a driven clutch member secured to said record-shifting drive shaft, projection means on said clutch members adapted to interlock to engage said clutch when said driving member is moved toward said driven member, means to instantly engage said clutch comprising means to energize said motor so that said armature is drawn immediately into its normal operating position between the pole faces of said field structure by the magnetic attraction thereof against the force of said biasing means, and means to disengage said clutch comprising means to deenergize said motor to permit said biasing means to slide said armature out of its normal operating position between the pole faces of said motor whereby said record strip is shifted an exact predetermined amount by said friction roller each time said shifter motor is energized for a predetermined period.

20. In a telescriber adapted to use a movable strip recording surface, the combination of, a pair of telescriber elements, a record strip, recording means adapted to produce a record trace on said strip, means operatively connecting each of said recording means to said telescriber elements, control means for energizing said telescriber elements and operating said record tracing means to produce a record on said strip, cyclically operable shifting means for advancing said strip in predetermined increments, comprising a record-shifting drive shaft adapted to be rotated by a motor, said shaft having a predetermined normal angular position, a friction roller secured to said shaft and positioned tangentially to said record strip to contact one face thereof so that said strip is advanced a predetermined distance by predetermined angular rotation of said shaft, a record-shifting motor for driving said record-shifting drive shaft having an armature secured to the motor shaft and a field structure, the pole faces of which are adapted to surround said armature, bearings slidably supporting said motor shaft, biasing means normally urging said armature axially to cause said shaft to slide in said bearings to move said armature out of its normal operating position between the pole faces of said field structure, a driving clutch member secured to said motor shaft on the end opposite to the direction in which said shaft is urged by said biasing means, a driven clutch member secured to said record-shifting drive shaft, projection means on said clutch members adapted to interlock to engage said clutch when said driving member is moved toward said driven member, a source of electric power, a first switch operated by rotation of said record-shifting drive shaft and open only when said shaft is in said normal angular position, a second switch operated by rotation of said record-shifting drive shaft and open only as said first switch closes when said shaft is in a predetermined angular position slightly advanced with respect to its normal angular position, and relay means responsive to energization of said telescriber elements to connect said switch in a circuit in series with said motor and said source of electric power and responsive to deenergization of said elements to connect said first switch in a circuit in series with said motor and said power supply.

21. In a telescriber adapted to use a movable strip recording surface, the combination of, a pair of telescriber elements, a record strip, recording means adapted to produce a record trace on said strip, means operatively connecting each of said recording means to said telescriber elements, control means for energizing said telescriber elements and operating said record tracing means to produce a record on said strip, cyclically operable shifting means for advancing said strip in predetermined increments, comprising a record-shifting drive shaft adapted to be rotated by a motor, said shaft having a predetermined normal angular position, a friction roller secured to said shaft and positioned tangentially to said record strip to contact one face thereof so that said strip is advanced a predetermined distance by predetermined angular rotation of said shaft, a record-shifting motor for driving said record-shifting drive shaft having an armature secured to the motor shaft and a field structure, the pole faces of which are adapted to surround said armature, bearings slidably supporting said motor shaft, biasing means normally urging said armature axially to cause said shaft to slide in said bearings to move said armature out of its normal operating position between the pole faces of said field structure, a driving clutch member secured to said motor shaft on the end opposite to the direction in which said shaft is urged by said biasing means, a driven clutch member secured to said record shifting drive shaft, projection means on said clutch members adapted to interlock to engage said clutch when said driving member is moved toward said driven member, a source of electric power, a first switch operated by rotation of said record-shifting drive shaft and open only when said shaft is in said normal angular position, a second switch operated by rotation of said record-shifting drive shaft and open only as said first switch closes when said shaft is in a predetermined angular position slightly advanced with respect to its normal angular position, relay means responsive to energization of said telescriber elements to connect said switch in a circuit in series with said motor and said source of electric power and responsive to deenergization of said elements to connect said first switch in a circuit in series with said motor and said power supply, means for winding up said record strip after it is moved past said recording means by said shifting means, wind-up motor means to drive said wind-up means, and a third switch operated by rotation of said record-shifting drive shaft and positioned to be closed only when said first and second switches are closed whereby said wind-up means is operated simultaneously with said shifting means.

22. In a telescriber adapted to use a movable strip recording surface, the combination of, a plurality of telescriber elements, a record strip, recording means adapted to produce a record trace on said strip, means operatively connecting said recording means to said telescriber elements, shifting means operable periodically for advancing said strip in predetermined increments, control means for energizing said elements and operating said record tracing means to produce a record on said strip, means responsive to operation of said control means for operating said record strip shifting means, means for winding up said record strip after it moves past said recording means, motor means for driving said wind-up means, and means for controlling the operation of said wind-up motor means and centrifugally operated friction clutch means interposed between said wind-up motor means and said wind-up means.

23. In a telescriber adapted to use a movable strip recording surface, the combination of, a plurality of telescriber elements, a record strip, recording means adapted to produce a record trace on said strip, means operatively connecting said recording means to said telescriber elements, shifting means operable periodically for advancing said strip in predetermined increments, control means for energizing said elements and operating said record tracing means to produce a record on said strip, means responsive to operation of said control means for operating said record strip shifting means, a hollow wind-up roll for winding up said record strip after it moves past said recording means, motor means for driving said wind-up roll, means for controlling the operation of said motor means, a drive shaft rotatably journaled along the axis of said roll, radially extending members attached to said shaft and having friction ends adapted to move outwardly due to the action of centrifugal force to contact the inside of said roll with increased friction as the speed of rotation of said wind-up motor means increases.

24. In an A. C. telescriber receiver, in combination, a pair of torque-producing A. C. reluctance motors adapted to be rotated proportionately, respectively, to the magnitude of two A. C. telescriber signals applied thereto, means for applying A. C. telescriber signals to said motors, said A. C. signals also producing continuous oscillations in said motors to overcome the static friction therein, a hub secured to the drive shaft of each of said motors and provided with a slot therein perpendicular to said shaft, a lever positioned in each of said slots and projecting therefrom perpendicular to said shafts, resilient material interposed between the walls of said slots and said levers, a linkage pivotally attached to each of said levers at one end and pivotally joined to each other at their other ends, a tracing surface perpendicular to the shafts of said motors, and a tracing stylus secured to said linkages at the pivotal connection therebetween and adapted to coact with said tracing surface to trace graphic characters thereon whereby overtravel of the moving system is inhibited and excessive amounts of said continuous motor oscillations are prevented from reaching said tracing stylus.

25. In a telescriber receiver, in combination, an A. C. motor having a shaft which is rotated in accordance with a telescriber signal, bearing means rotatably supporting said shaft, a lever pivoted upon said shaft and constituting an element of a leverage assembly which is operated to trace the graphic characters being telescribed, a lever operating means attached to said shaft comprising a hub having a radial hole therethrough through which said lever extends, a pair of springs positioned upon opposite sides of said lever within said hole, each of said springs having a central hairpin portion extending into a radial recess in said hub and arm portions extending along said lever and having their ends contacting said lever at points which are substantially at the periphery of said hub to permit limited relative movement between said shaft and said lever, whereby the A. C. vibrations which tend to reduce the static friction of said bearing means are not apparent in the traces of the graphic characters being telescribed.

WALLACE A. LAUDER.
EDWARD F. CAHOON.